US012793558B1

(12) United States Patent
Jangda et al.

(10) Patent No.: US 12,793,558 B1
(45) Date of Patent: Nov. 10, 2026

(54) METHODS AND SYSTEMS FOR AIR AMBULANCE DISPATCH

(71) Applicant: RAPIDSOS, INC., New York, NY (US)

(72) Inventors: Ovais Jangda, Mississauga (CA); Jennifer White, Lenoir City, TN (US); Kyle Yoshitaka Ono, Martinez, CA (US); Justin Bain Rodino, Winston, GA (US); Andrew Lee Hwang, New York, NY (US); Timothy Choldas, Pleasant Prairie, WI (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 19/254,190

(22) Filed: Jun. 30, 2025

(51) Int. Cl.

| | |
|---|---|
| ***G08G 5/23*** | (2025.01) |
| ***G06F 3/04842*** | (2022.01) |
| ***G08G 5/26*** | (2025.01) |
| ***H04M 3/51*** | (2006.01) |
| ***H04W 4/90*** | (2018.01) |

(52) U.S. Cl.
CPC ................. *G08G 5/23* (2025.01); *G08G 5/26* (2025.01); *H04M 3/5116* (2013.01); *H04W 4/90* (2018.02); *G06F 3/04842* (2013.01)

(58) Field of Classification Search
None
See application file for complete search history.

(56) References Cited

U.S. PATENT DOCUMENTS

| | | | | |
|---|---|---|---|---|
| 10,137,047 | B1 * | 11/2018 | DiFrancesco | A61G 3/001 |
| 11,330,104 | B1 * | 5/2022 | Pappas | H04L 65/1069 |
| 11,570,607 | B2 * | 1/2023 | Pellegrini | G06F 3/0484 |
| 11,990,230 | B2 * | 5/2024 | Pierson | G08B 25/016 |
| 2009/0284348 | A1 * | 11/2009 | Pfeffer | G08B 25/006 340/7.3 |
| 2013/0065628 | A1 * | 3/2013 | Pfeffer | G08B 25/016 455/521 |
| 2016/0098930 | A1 * | 4/2016 | Dillingham | G01S 19/13 715/772 |
| 2025/0119490 | A1 * | 4/2025 | Martin | H04W 4/90 |
| 2025/0259739 | A1 * | 8/2025 | Martin | H04W 4/90 |

* cited by examiner

*Primary Examiner* — Henry Orr
(74) *Attorney, Agent, or Firm* — Michael L. Ross

(57) ABSTRACT

An emergency response data system (ERDS) integrates an air ambulance dispatch system into an emergency management application to reduce the time consumed in dispatching an air ambulance from an emergency communications center (ECC). The emergency management application may auto-populate a digital air ambulance dispatch request user interface (UI) with a location of a 911 call, a text to 911, or another emergency incident. The emergency management application communicates the incident location to an air ambulance server to receive air ambulance availability and/or an estimated time of arrival (ETA) to the incident location. Displaying the ETA prior to dispatch enables an ECC telecommunicator to dispatch the fastest type of ambulance (e.g., air or ground). The emergency management application transmits an air ambulance request to the air ambulance server and receives updates on the status of the request and of the air ambulance, which are displayed for a user at the ECC.

14 Claims, 20 Drawing Sheets

PROCESS FOR PROVIDING EMERGENCY AIR TRANSPORTATION FOR AN EMERGENCY INCIDENT 420

PROCESS FOR PROVIDING EMERGENCY AIR TRANSPORTATION FOR AN EMERGENCY INCIDENT 500

PROCESS FOR PROVIDING EMERGENCY AIR TRANSPORTATION FOR AN EMERGENCY INCIDENT 520

METHODS AND SYSTEMS FOR AIR AMBULANCE DISPATCH

TECHNICAL FIELD

This disclosure relates generally to emergency management systems, and in particular to providing air ambulance dispatch capability within an emergency management system.

BACKGROUND

In the critical moments following an emergency, rapid and accurate information dissemination is paramount for effective response. Emergency communication centers (ECCs), such as 911 call centers, serve as vital hubs for receiving initial reports and coordinating the dispatch of first responders. First responders, including firefighters, police officers, and emergency medical technicians, rely on timely and relevant information to navigate to the scene, assess the situation, and implement appropriate actions.

The ability of emergency personnel to quickly understand the nature of the emergency, the location, and any potential hazards significantly impacts response times and the safety of both the public and the responders. Traditional emergency response workflows often involve manual information gathering and dissemination, which can be time-consuming and prone to human error, particularly under the high-pressure conditions inherent in emergency situations. Furthermore, the increasing volume and diversity of data sources related to emergencies, such as sensor data from smart devices, telematics information from vehicles, and real-time environmental conditions, present both opportunities and challenges for efficient analysis and utilization. The effective integration and intelligent processing of this disparate information hold the key to enhancing situational awareness and optimizing emergency response strategies.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
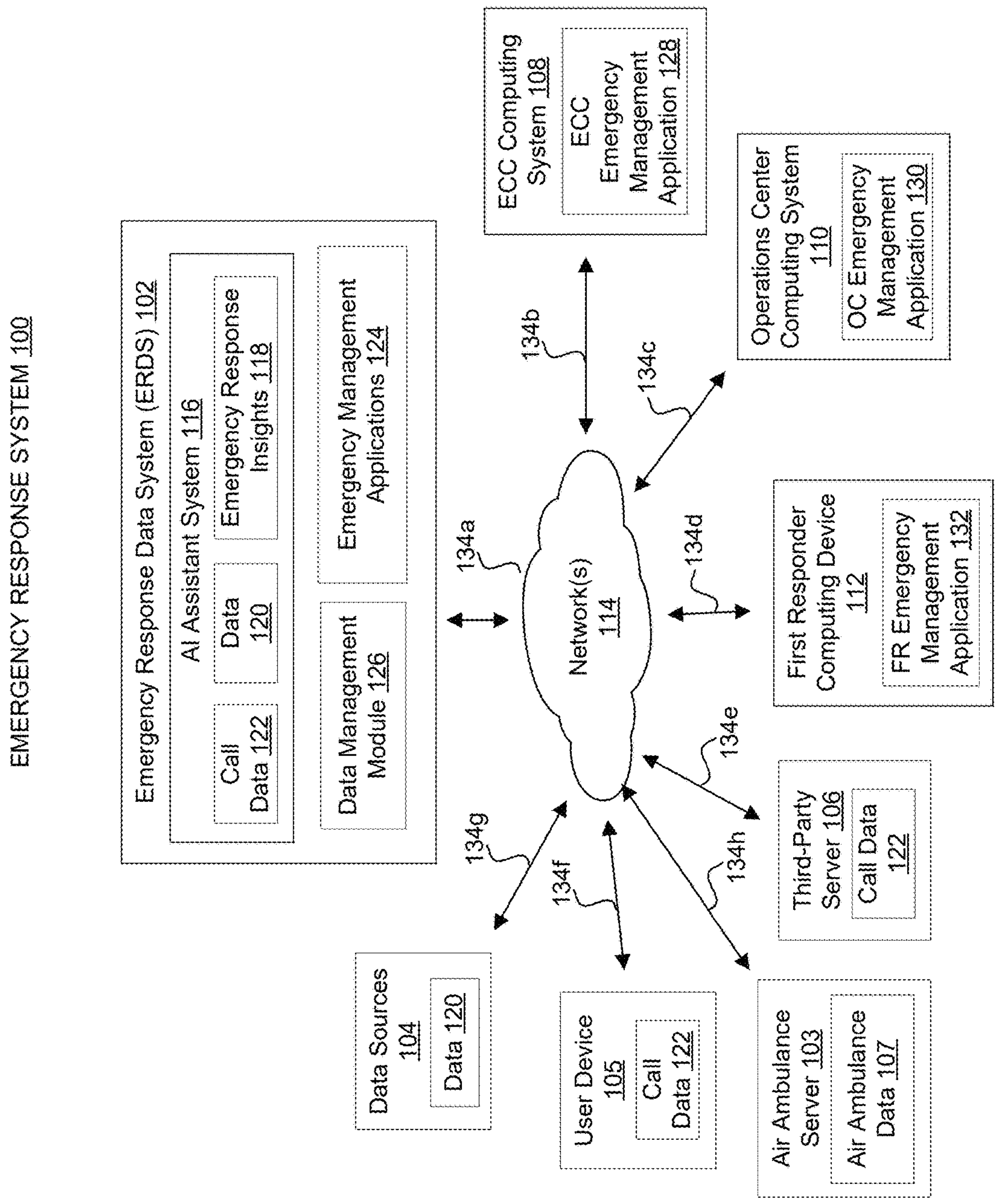
FIGS. 1A and 1B illustrate example diagrams of an emergency response system, in accordance with embodiments of the disclosure.

Various aspects of the disclosure include methods and systems for providing air ambulance dispatch services from an emergency response system. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A public emergency services agency may be established to provide a variety of services. A public emergency services agency can include a 911 call center, a railway network operations center (NOC), a primary call center, a secondary call center (e.g., that receives calls from or routes calls to a primary call center), and the like. A public emergency services agency may be referred to as an emergency service provider (ESP) or an emergency communications center (ECC). One type of ESP or ECC is a public safety answering point (PSAP). A PSAP is another name for a 911 call center that receives emergency calls and dispatches emergency (first) responders in response to the emergency communications (e.g., calls, text, or video messages to 911).

As used herein, a field or first responder may refer to a firefighter, an emergency medical technician, a paramedic, a police officer, a peace officer, an emergency medical dispatcher, a search and rescue team member, a hazardous materials (HazMat) responder, volunteer emergency workers, and/or public health officials. The systems, processes, and overall technologies disclosed herein may be applicable or implemented for one or more of the various types of first responders, despite some specific examples being directed to firefighters and/or medical service providers for illustrative purposes.

A critical problem in emergency response is that delays in air ambulance dispatch can lead to more severe injuries. Currently, two options are available for dispatching air ambulances. The first option is for an ECC telecommunicator to call an air ambulance service to determine if the air ambulance service has helicopters available in a particular region. The ECC telecommunicator then verbally provides coordinates (e.g., latitude and longitude) to the service provider. This operation can take minutes. The next option is that some of the air ambulance service providers provide a webpage that can be filled out. Again, finding the coordinates of the emergency incident and typing the coordinates into a webpage along with other relevant information. This too may take minutes. However, in a life-threatening situation, minutes or even seconds of delays in the arrival of a field responder can be the difference between life and death.

Embodiments of the disclosure include an emergency response data system that is operable to dispatch an air ambulance to the scene of an emergency incident. The emergency response data system includes an air ambulance request user interface (UI) that is configured to be auto-populated with the incident location by the emergency response data system. The emergency response data system receive the incident location immediately after a person calls 911 or sends a text message to 911. Auto-populating the air ambulance request UI may decrease the time it would take an ECC telecommunicator to dispatch an air ambulance using traditional techniques.

The emergency response data system communicates with an air ambulance server to determine an estimated time of arrival (ETA) for an air ambulance to the incident location. The emergency response data system may send coordinates of the incident location to request the ETA of the nearest air ambulance, in one implementation. The emergency response data system may send coordinates of the incident location to the air ambulance server to determine the location of the air ambulance that is near or nearest to the incident location. The emergency response data system may use the air ambulance location to determine the ETA. The ETA may be displayed in an emergency management application for the ECC telecommunicator, and the telecommunicator may decide between ground and air ambulances based on the ETA of the two types of transport-potentially reducing emergency response time further.

The emergency response data system may be configured to dispatch an air ambulance using a user-selected location. An ECC telecommunicator may receive communications over the radio (e.g., UHF, VHF, etc.) from field responders about an incident that warrants air ambulance support. The ECC telecommunicator may select a pickup location (e.g., an incident location or nearby landing zone location) on a map displayed by an emergency management application, and the emergency response data system may auto-populate an air ambulance request with coordinates for the pickup location, to facilitate efficient submission of the air ambulance request.

The emergency response data system may be configured to automatically dispatch an air ambulance based on a severity of an incident detected by one or more sensors. The emergency response data system may receive sensor data (e.g., vehicle telematics, image sensor, heat detector, smoke detector) and analyze the sensor data to determine a severity score for the incident. The severity score may be determined by weighing a variety of incident-related factors, such as, the number of rollovers a vehicle performed, an initial speed of the vehicle, the impact intensity (e.g., from a shock sensor), the number of vehicles involved in an incident, the vehicle type (e.g., semi-truck, electric vehicle, motorcycle, etc.), seatbelt usage, whether a person was ejected from the vehicle, weather conditions, proximity to a hospital (e.g., 5 minutes vs. 1 hour), structural integrity of a building, and/or the number of floors on a building that are on fire, for example. Each of the various factors may be assigned different weights, so more deadly factors (e.g., ejection from a vehicle) have less impact on the severity score than less inherently lethal factors (e.g., the weather). A combination of the factors may be used to define the severity score (e.g., on a scale of 0 to 10), the severity score may be compared to a threshold (e.g., 6.5), and the emergency response data system may be configured to automatically dispatch an air ambulance if the severity score exceeds the threshold, to reduce delays related to analyzing information and manually dispatching life supporting services, for example.

In one implementation, a large language model (LLM), an artificial intelligence (AI) agent, or other agentic AI technologies may define an AI system that may be used to determine a severity of an incident and/or automatedly dispatch an air ambulance to the incident location. The AI system (e.g., an LLM) may be trained on hundreds, thousands, or millions of emergency incidents represented by sensor data and may be trained on the health conditions of the accident victims to output/determine, for example, a likelihood of survival with/without air ambulance support. The emergency response data system may be configured to automatically dispatch an air ambulance based on output or determination of the LLM or other AI tools, for example.

The AI system may be implemented using one or more AI agents, LLMs (large language models), RAG (retrieval, augmentation, and generation) systems/architectures, and/or combinations thereof. While LLMs are typically implemented for strengths at understanding and generating human-like text, AI agents can be implemented to perform tasks that go beyond language, such as making decisions and interacting with systems or the physical world. In accordance with embodiments of the disclosure, emergency response AI agents may build upon LLMs by adding the instructions and/or logic to autonomously execute actions and workflows to support emergency management and response. As such, emergency response AI agents may be operable to perceive the emergency response environment, make decisions, and execute actions (e.g., provide suggestions, notifications, etc.) autonomously or semi-autonomously.

The disclosed systems and methods transform the technological area of emergency response management. For example, the disclosed emergency response data system may advantageously transform air ambulance dispatch from a reactive procedure to a more proactive, data-driven, and efficient operation. This proactive approach may offer several immediate benefits: it may drastically reduce the time between an incident and air ambulance dispatch, which is critical in life-threatening situations. By leveraging sensor data and/or AI to automatically assess incident severity and auto-populate requests, it reduces human error and the delays inherent in manual processes. This leads to significantly faster response times, ultimately improving patient outcomes and potentially saving more lives by ensuring critical care arrives more swiftly. The ability to compare ground and air ambulance ETAs also allows telecommunicators to make optimal, real-time decisions, further enhancing the efficiency and effectiveness of emergency medical services across the industry. Various embodiments of the disclosure are described hereafter and represented in FIGS. 1A-7.

Figure 1B:
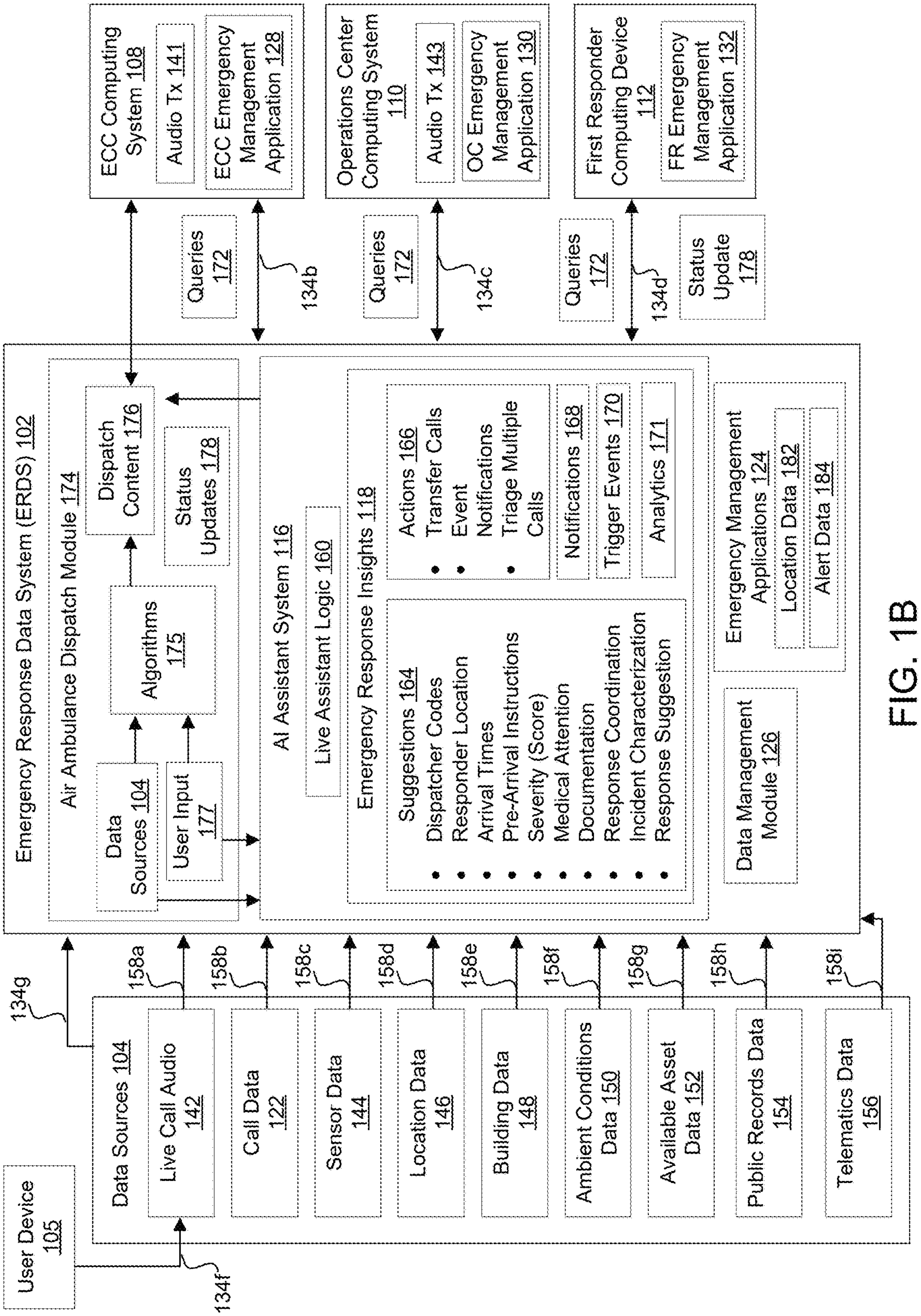

FIGS. 1A and 1B illustrate example embodiments of an emergency response system that is configured to enhance the efficiency and effectiveness of dispatching air ambulance services, in accordance with aspects of the disclosure. FIG. 1A illustrates a diagram of an emergency response system 100 that includes an emergency response data system (ERDS) 102 that is communicatively coupled to an air ambulance server 103, a number of data sources 104, a user device 105, a third-party server 106, an ECC computing system 108, an operations center (OC) computing system 110, and/or a first responder computing device 112 through one or more networks 114, according to an embodiment. Networks 114 may include a number of wired networks, wireless networks, network components, and infrastructure.

A number of communications channels 134 (individually, 134*a*, 134*b*, 134*c*, 134*d*, 134*e*, 134*f*, 134*g*, and 134*h*) may communicatively couple the various components of emergency response system 100.

Emergency response data system 102 includes an artificial intelligence (AI) assistant system 116 that is configured to generate emergency response insights 118 from data 120 and call data 122, according to an embodiment. AI assistant system 116 is operable to determine characteristics of call data 122 and aggregate the characteristics with data 120, according to an embodiment. AI assistant system 116 is operable to analyze the aggregated characteristics and data 120 to generate emergency response insights 118, according to an embodiment. AI assistant system 116 and/or emergency response data system 102 may then provide emergency response insights 118 to ECC computing system 108, operations center computing system 110, and/or first responder computing device 112 for receipt by emergency responders and/or emergency management personnel.

Emergency response data system 102 is configured to host and/or support a number of emergency management applications 124 that are accessed by and/or operated by ECC computing system 108, operations center computing system 110, and/or first responder computing device 112, according to embodiments of the disclosure. Emergency response data system 102 may be implemented with one or more servers that may be distributed across multiple data centers. Emergency management applications 124 may be implemented on/in emergency response data system 102 as web-based applications that are accessed via a web browser, a webhook, a persistent webhook, and/or one or more secure connections. Emergency management applications 124 may be configured to process and push (and receive) data to a mobile application or an operating system (OS) specific application that is downloaded to and operated by a particular computing system or device (e.g., a first responder smart phone). Data 120 and call data 122 may be retrieved, received, managed, and directed to AI assistant system 116 and/or emergency management applications 124 with a data management module 126 to support generating and delivering emergency response insights 118.

The various computing systems that receive emergency response insights 118 are tools that may be used by emergency response personnel and emergency responders to dispatch, communicate about, and respond to incidents and emergencies that are represented by or in data 120 and/or call data 122, according to an embodiment. ECC computing system 108 represents a computing system (e.g., a terminal, a server, a personal computer, a laptop, etc.) operated at or for an ECC. ECC computing system 108 is configured to operate or provide an ECC emergency management application 128. ECC emergency management application 128 may be communicatively coupled to emergency response data system 102 to receive emergency response insights 118, data 120, and/or call data 122. ECC emergency management application 128 may be configured with a graphical user interface to visually represent emergency events and incidents (e.g., using maps, queues, icons, data cards, etc.) and to enable emergency response personnel (e.g., 911 dispatchers, telecommunicators, etc.) to dispatch and communicate emergency events.

Operations center computing system 110 represents a computing system (e.g., a terminal, a server, a personal computer, a laptop, etc.) operated at or for an operations center (e.g., a global operations security center (GSOC), a rail network operations center (NOC), etc.). Operations center computing system 110 is configured to operate or provide an operations center emergency management application 130. The operations center emergency management application 130 provides a graphical user interface to enable emergency response personnel (e.g., an operator, risk manager, security personnel, etc.) of corporations, other businesses, residences, academic institutions, and/or private entities to have awareness of incidents (e.g., emergency events) that occur on their particular premises or managed premises.

First responder computing device 112 is representative of computing systems, mobile devices, and/or in-vehicle devices used by emergency responders to navigate to, coordinate for, and communicate about emergency events and other incidents, according to an embodiment. First responder emergency management application 132 may be operated on or by first responder computing device 112. First responder emergency management application 132 is communicatively coupled to emergency response data system 102 to receive emergency response insights 118, data 120, and/or call data 122 to inform the preparation and response to emergency events, according to an embodiment.

User device 105 may include a telephone, a smart phone, tablet, a laptop, personal computer, a chrome book, or other computing devices that may be used, to initiate an emergency call (e.g., a 911 call) or to otherwise report an incident, according to an embodiment. Call data 122 represents audio data, video, data, images, multimedia messages, and/or text messages provided from user device 105 to ECC computing system 108 and/or operations center computing system 110, according to an embodiment.

Third-party server 106 may include a telecommunications or device manufacturer server that receives location data, user identification data, and/or call statistics for emergency calls made by user device 105. Third-party server 106 may be configured to provide call data 122 to emergency response data system 102 to support operation of emergency applications 124, according to an embodiment.

Air ambulance server 103 is representative of one or more computing systems that may be used and/or managed by one or more air ambulance service providers. Air ambulance server 103 may include one or more application programming interfaces (APIs) or network interfaces that support queries about the status, location, ETA, or other air ambulance data 107. Queries to the air ambulance server 103 may be based on a location of initiated emergency communications (e.g., 911 call, text to 911, etc.). In response to receipt of an incident location, air ambulance server 103 may be configured to provide an ETA of one or more air ambulances (e.g., helicopters, airplanes, drones, etc.) that are proximate to the incident location. In one implementation, air ambulance server 103 responds to a request with the air ambulance that is available and nearest to the incident location. Digital communication with air ambulance server 103 may enable partially or fully automated dispatches of air ambulances to incident locations, in accordance with aspects of the disclosure.

FIG. 1B illustrates an example block diagram of an emergency response system 140 and is representative of an example implementation of emergency response system 100, in accordance with aspects of the disclosure.

Data sources 104 may include one or more of a number of data types and data sources that may be used to identify, characterize, analyze or otherwise gain insights about emergency events and other incidents, according to an embodiment. Examples of data sources 104 include, but are not limited to, live call audio 142, call data 122, sensor data 144, location data 146, building data 148, ambient conditions data 150, available asset data 152, public records data 154, and telematics data 156, according to an embodiment. Live call audio 142 may be received by emergency response data system 102 by configuring a call audio transmitter 141 to forward/provide live call audio 142 from ECC call handling equipment (e.g., from ECC computing system 108) and/or by configuring call audio transmitter 143 to forward/provide live call audio 142 from GSOC/NOC call handling equipment (e.g., from operations center computing system 110), for example. Live call audio 142 may also include radio-based dispatches or transcripts of radio-based dispatches of emergencies from an ECC. Call data 122 may include call duration, caller name, repeat call statistics, etc. of a call to an ECC or operations center. Sensor data 144 may include, but is not limited to, data received or retrieved from residential buildings, commercial buildings, personal medical devices, personal safety devices, industrial structures, vehicles, crash detectors, smoke alarms, fire alarms, smart cameras, home security devices, moisture detectors, motion detectors, shock detectors, location sensors, gas detectors, pressure sensors, or the like, according to various embodiments of the disclosure. Location data 146 may include a location of a sensor or incident (e.g., taken from a GPS unit of a smartphone). Building data 148 may include construction materials, structure age, floorplans, renovation history, electrical schematics, HVAC layout, or the like. Ambient conditions data 150 may include weather data, weather forecasts, road conditions, wind speeds, visibility, cloud conditions, temperature, or the like. Available asset data 152 may include, but is not limited to, a number of available drones, a number of available medical devices (e.g., automated external defibrillator), a number of vehicles, a number of sprinklers in a building, or the like. Public records data 154 may include, but are not limited to, personal property records, arrest records, residential addresses, etc. Telematics data 156 may include various types of vehicle data, such as accelerometer data, gyroscope data, air bag sensors, vehicle log data, or the like. Additional miscellaneous data source or data types may include social media feeds, new feeds, geofence data, traffic feeds, visual impairment status, auditory impairment status, or the like. The various data sources 104 may be communicatively coupled to emergency response data system 102 through a number of communications channels 158 (individually, 158*a*, 158*b*, 158*c*, 158*d*, 158*e*, 158*f*, 158*g*, 158*h*, and 158*i*), according to embodiments of the disclosure.

AI assistant system 116 may include a number of components to support generating emergency response insights 118 for display by one or more of ECC emergency management application 128, operations center emergency management application 130, and/or first responder emergency management application 132, according to an embodiment. AI assistant system 116 may be configured to determine a severity of an emergency incident and/or generate a corresponding severity score to facility automated air ambulance dispatch operations by ERDS 102. AI assistant system 116 may include live assistant logic 160, which may include aspects of a retrieval, augmentation, generation (RAG) system, to generate emergency response insights 118 based on call data 122, data sources 104, and/or trigger events 170, in accordance with aspects of the disclosure.

Emergency response insights 118 may include suggestions 164, actions 166, and/or notifications 168 that are generated in response to one or more trigger events 170, according to an embodiment. Emergency response insights 118 may also include analytics 171 that represent emergency communications statistics handled by an ECC, an operations center, and/or a first responder computing device at a particular location, for a region, and/or for a state or country. Suggestions 164 may be displayed or transmitted to emergency applications 124 to provide summaries, suggested actions, additional awareness, or other insights to a dispatcher, telecommunicator, emergency management operator, or first responder, according to an embodiment. Suggestions 164 may include, but are not limited to, 911 dispatcher codes, responder location, arrival times, pre-arrival instructions for first responders, severity of an incident (e.g., a severity score), live updates to incidents (based on live audio analysis and/or sensor data), medical procedures, documentation (e.g., standard operating procedures), response coordination, incident, characterization, and/or response suggestions, in accordance with various embodiments of the disclosure. Suggestions 164 may also include AI generated search terms and/or search phrases that are based on historical context of a particular user, spatial context, and/or temporal context, for example. Suggestions 164 may also include suggested actions, such as show traffic layer, dispatch to a particular location, display video feed layer, provide estimated time of arrival (ETA) of first responders, or other selectable actions. Emergency response data system 102 may cause one or more suggestions 164 to be displayed on a user interface of ECC emergency management application 128, operations center emergency management application 130, and/or first responder emergency management application 132, according to various embodiments of the disclosure.

Actions 166 are examples of actions that AI assistant system 116 may, in coordination with emergency response data system 102, initiate to facilitate a response to an emergency event. Actions 166 may include, but are not limited to, transfer calls (e.g., to an ECC having jurisdictional authority for a call), triage multiple calls (e.g., group, associate, combine, or summarize), call a point of contact (e.g., at a business location of an incident), search for a phone number of a point of contact, communicate with air ambulance server 103 to dispatch an air ambulance, and/or generate a group chat or a group video conference between people who are located near or who are responding to a particular incident, according to various implementations of the disclosure.

Notifications 168 may include informational content or alerts derived from a combination of the trigger events 170, live call audio 142, or other data sources 104, in accordance with aspects of the disclosure. Notifications 168 may include displaying particular insights about one or more related incidents, information about changes to an incident (e.g., a change of location, nature of a fire, number of victims, etc.), available asset updates, or the like.

Trigger events 170 include events that may serve to initiate the aggregation of data sources 104, analysis of data sources 104, and/or the generation of emergency response insights 118, according to an embodiment. Examples of trigger events 170 may include, but are not limited to, a 911 call, a call to a rail NOC, a call to a GSOC, a text message to 911, a text message to a rail NOC, initiating a videoconference with 911, an activated alarm, a change in sensor data, a change in ambient condition data 150 (e.g., an abnormal increase or decrease in temperature or moisture in a space), receipt of a query 172 from ECC computing system 108, receipt of a query 172 from an operations center computing system 110, or receipt of a query from first responder computing device 112, according to embodiments of the disclosure. Trigger events 170 may also include telematics data associated with a vehicular accident.

Analytics 171 include various metrics for communications occurring at an ECC, a region of ECCs, a state of ECCs, one or more operations centers, and/or one or more other first responder devices or stations, in accordance with aspects of the disclosure. The metrics can cover areas such as call handling, resource management, and overall operational efficiency. The metrics may also include call answer times, abandonment rates, average handling time, and call volume trends to ensure service levels are being met and identify potential bottlenecks in the system. The metrics may also include incident response times and resource allocation to gauge the efficiency of emergency response coordination. As disclosed herein, AI assistant system 116 may include one or more AI agents that may be configured to generate visualizations (e.g., charts, graphs, etc.) based on underlying context data, natural language questions, historical datasets, and/or forecasts.

Live assistant logic 160 include instructions, scripts, and/or one or more processes that support operations of AI assistant system 116, according to an embodiment. For example, live assistant logic 160 may be configured to communicate with data management module 126 to receive data for processing. Live assistant logic 160 may be configured to provide generated emergency response insights 118 to emergency management applications 124, for example. Live assistant logic 160 may include or provide various application programming interfaces (API) to facilitate receipt of query 172, according to an embodiment. Live assistant logic 160 may include decision trees, flow diagrams, instructions, one or more AI agents, one or more large language models (LLMs), or other processes to support a live (real-time) interactions with human operators (e.g., dispatcher, telecommunicator, operations center operator, first responder, etc.), according to an embodiment.

Live assistant logic 160 may be implemented using one or more of a variety of technologies. Live assistant logic 160 may be a service that emergency response data system 102 communicates with remotely or may include a number of libraries and software packages installed onto one or more local or distributed server (e.g., cloud) systems. Live assistant logic 160 may be implemented using transfer learning models that apply knowledge learned from one task to another, typically using pre-trained models. Examples of transfer learning models that may be used include, but are not limited to, BERT (bidirectional encoder representations from transformers): a transformer-based model for natural language processing tasks; GPT (generative pretrained transformer): a generative model for text-based tasks; and ResNet: a pre-trained deep learning model commonly used for image classification. Live assistant logic 160 may incorporate other types of models, such as deep learning models, unsupervised models, generative models, recommender systems, or the like. Examples of deep learning models may include convolutional neural networks (CNN), which may be used for image recognition tasks; recurrent neural networks (RNN), which may be used for sequential data, such as time series or natural language; and long short-term memory networks (LSTMN), for example.

Live assistant logic 160 may be implemented using one or more large language models (LLMs), according to an embodiment. LLMs are AI models that are trained to understand and generate human language. LLMs use large amounts of text data to learn patterns, context, and meaning in language. Examples of LLMs include, but are not limited to, generative pretrained transformers (GPTs), BERT, DistilBERT, T5 (Text-to-Text Transfer Transformer), XLNet, Turing-NLG, LLaMA (Large Language Model Meta AI), Claude, PaLM (Pathways Language Model), Megatron-Turing NLG, ChatGPT, OpenAI Codex, ERNIE (Enhanced Representation through Knowledge Integration), and/or Grok.

Live assistant logic 160 or other portions of AI assistant system 116 may be at least partially implemented on a computing system that is local to the ECC to reduce latency in data transmission between an ECC and remote data processing servers. For example, live assistant logic 160 and/or a RAG system may be implemented using a local LLM, allowing live call audio and historical ECC data to be received from call handling equipment, processed on-premises, and re-inserted into the call handling equipment or to an ECC terminal.

Emergency management applications 124 may provide location data 182 and alert data 184, in addition to emergency response insights 118, according to an embodiment. Location data 182 may include a device-based hybrid (DBH) location of an emergency event. The device-based hybrid location may be derived from call data 122 and/or may be received from third-party server 106. The device-based hybrid location may be based on GPS location of user device 105 or based on registered locations of electronic devices in the vicinity of user device 105, according to various embodiments. Alert data 184 may include alerts or notifications that are based on sensor data 144 or one or more additional data sources 104, according to an embodiment. Location data 182 and/or alert data 184 may be provided to or displayed by one or more of the emergency management applications 128, 130, and/or 132, according to various embodiments.

Emergency response data system 102 and AI assistant system 116 may be configured to be responsive to queries 172 that may be entered into and received through any one of emergency management applications 128, 130, and/or 132. Emergency response data system 102 and AI assistant system 116 are configured to be responsive to queries 172 in the absence of a call-based trigger and/or a data-based trigger, according to an embodiment. Emergency management applications 128, 130, and/or 132 may include a query input text box, may perform audio to text, or may receive and transmit audio to provide queries 172 to AI assistant system 116. AI assistant system 116 may use queries 172 as a trigger event 170. AI assistant system 116 may convert queries 172 into a semantic vector to perform a vector search of a vector database, a content search of a vector database, and/or a hybrid vector-content search of a vector database. Queries 172 may include queries related to summaries, graphs, charts, or other visualizations of analytics for an ECC, operations center, and/or first responder device/station, according to an embodiment. AI assistant system 116 may provide responses to queries 172 as emergency response insights 118 and using similar UI elements in graphical user interfaces of emergency management applications 128, 130, and/or 132.

ERDS 102 includes an air ambulance dispatch module 174 that is operable to support air ambulance dispatch services from one or more emergency management applications 124, in accordance with aspects of the disclosure. Air ambulance dispatch module 174 includes one or more algorithms 175 that generate and/or receive dispatch content 176 based on one or more of data sources 104 and/or based on user input 177, according to an embodiment. Air ambulance dispatch module 174 may also be configured to selectively provide status updates 178 to one or more emergency management applications 124.

Algorithms 175 may include decision trees, processes, methods, and/or AI systems to generate dispatch content 176. In one implementation, algorithms 175 receive user input 177 that selects a particular emergency communication (e.g., a user selects an incident from an incident queue) for air ambulance dispatch. Algorithms 175 may be configured to auto-populate an air ambulance dispatch user interface (UI) (e.g., a request form) with location data 146 that is representative of a location of a 911 call or a text to 911, which may be received from a third-party server 106 (e.g., a telecommunications server), in accordance with aspects of the disclosure. Upon receipt of additional data sources 104 and/or user input 177, algorithms 175 may be configured to generate dispatch content 176 that may be transmitted to air ambulance server 103, ECC emergency management application 128, and/or field/first responder (FR) emergency management application 132, in accordance with various aspects of the disclosure.

Algorithms 175 may be configured to support additional workflows for dispatching an air ambulance from ECC emergency management application 128. For example, algorithms 175 may receive user input 177 that is representative of a user clicking a location on a map. Algorithms 175 may use the location to auto populate a latitude and longitude coordinates or other address coordinates into an air ambulance dispatch form or UI. Algorithms 175 may gather additional user input 177 (e.g., details about the emergency incident, weather information, additionally dispatched air ambulances) to generate dispatch content 176 to dispatch an air ambulance to the location (e.g., a pickup location) selected on a map through user input 177.

Algorithms 175 may support an automated dispatch of an air ambulance, in response to determining a particular severity of an accident, in accordance with aspects of the disclosure. For example, one or more of data sources 104 (e.g., telematics data 156, ambient conditions data 150, sensor data 144, etc.) may indicate that a vehicle has crashed and rolled over multiple times (e.g., six rollovers). Algorithms 175 may be configured to receive the data from data sources 104 and determine that the severity of the vehicle vehicular accident warrants/justifies an auto-dispatch of an air ambulance. In response, algorithms 175 may generate dispatch content 176 that includes a time, location, and request for air ambulance service transmitted to air ambulance server 103, according to an embodiment. The request represented by dispatch content 176 may also (e.g., concurrently) be transmitted to ECC emergency management application 128 and/or field responder emergency management application 132, according to an embodiment. These and additional embodiments are further disclosed in FIGS. 2A-2K and 3-7, in accordance with various embodiments of the disclosure.

Figure 2A:
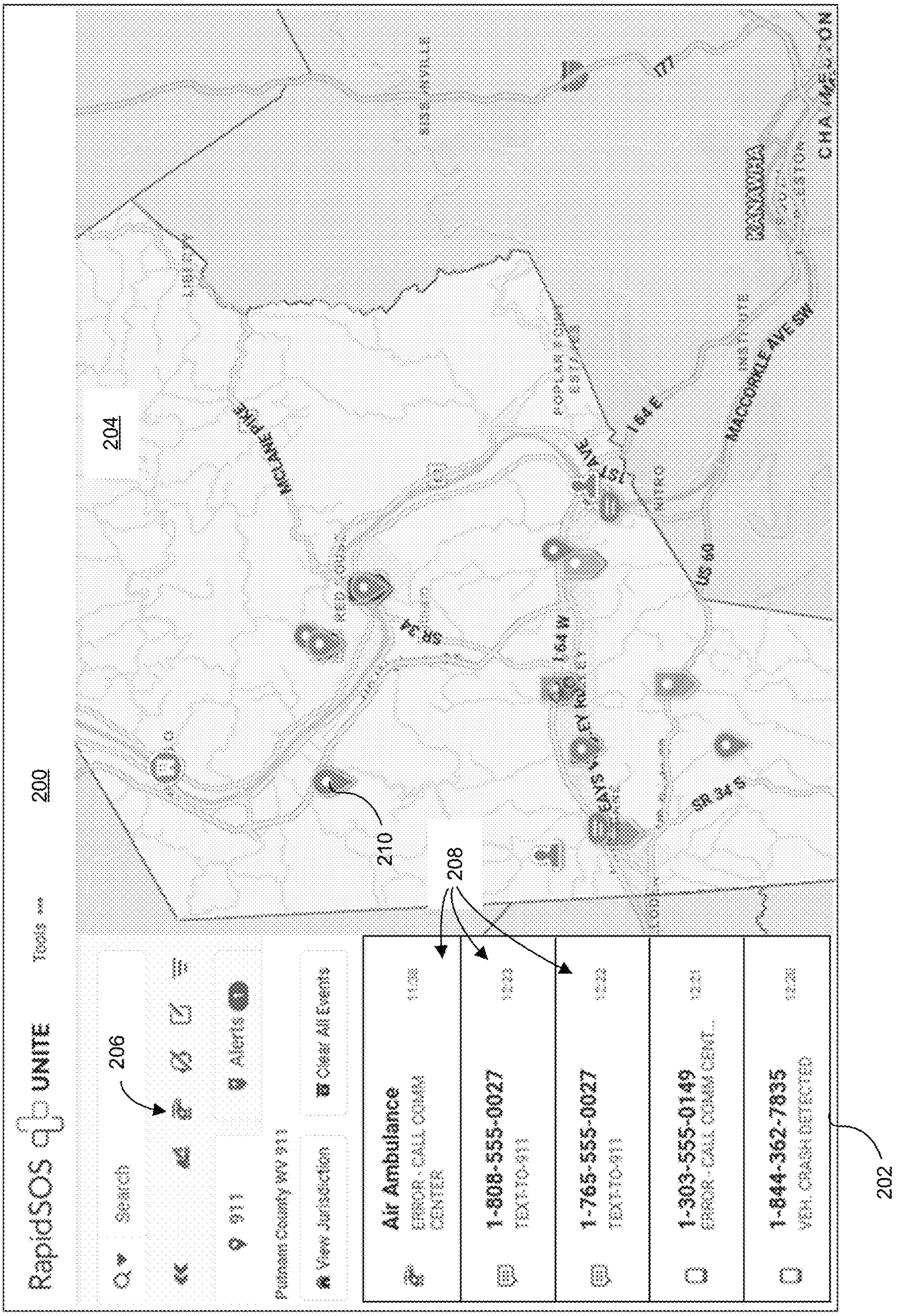
FIGS. 2A, 2B, 2C, 2D, 2E, 2F, 2G, 2H, 2I, 2J, and 2K illustrate example diagrams of user interfaces for dispatching an air ambulance from an emergency management application at an emergency communication center (ECC), in accordance with aspects of the disclosure.

FIGS. 2A-2K illustrate various example diagrams of an emergency management UI 200 that may be provided by ERDS 102 and at least partially displayed on ECC computing system 108, to facilitate providing air ambulance services to a person or persons in need of air ambulance support, according to various embodiments of the disclosure. FIG. 2A illustrates a diagram of emergency management UI 200, according to an embodiment. Emergency management UI 200 includes an incident queue 202, a map 204, and a dispatch icon 206, according to an embodiment. Incident queue 202 may display a number of incidents 208 that are displayed in incident queue 202, in response to receipt of an indication of an emergency communication (e.g., a 911 call or a text to 911) by ERDS 102 (shown in FIGS. 1A and 1B). The indication of the emergency communication may include a telephone number, a location, a timestamp, and a personal identifier (e.g., a name) of a person registered with or associated with a user device 105 (e.g., a cell/smart phone). Map 204 is configured to display one or more pins 210 that represent a location of an initiated emergency communication. Each of pins 210 may be associated with a corresponding one of the incidents 208 displayed in incident queue 202. Responsive to selection of dispatch icon 206, ERDS 102 and/or ECC emergency management application 128 may be configured to display an air ambulance request UI, according to an embodiment.

Figure 2B:
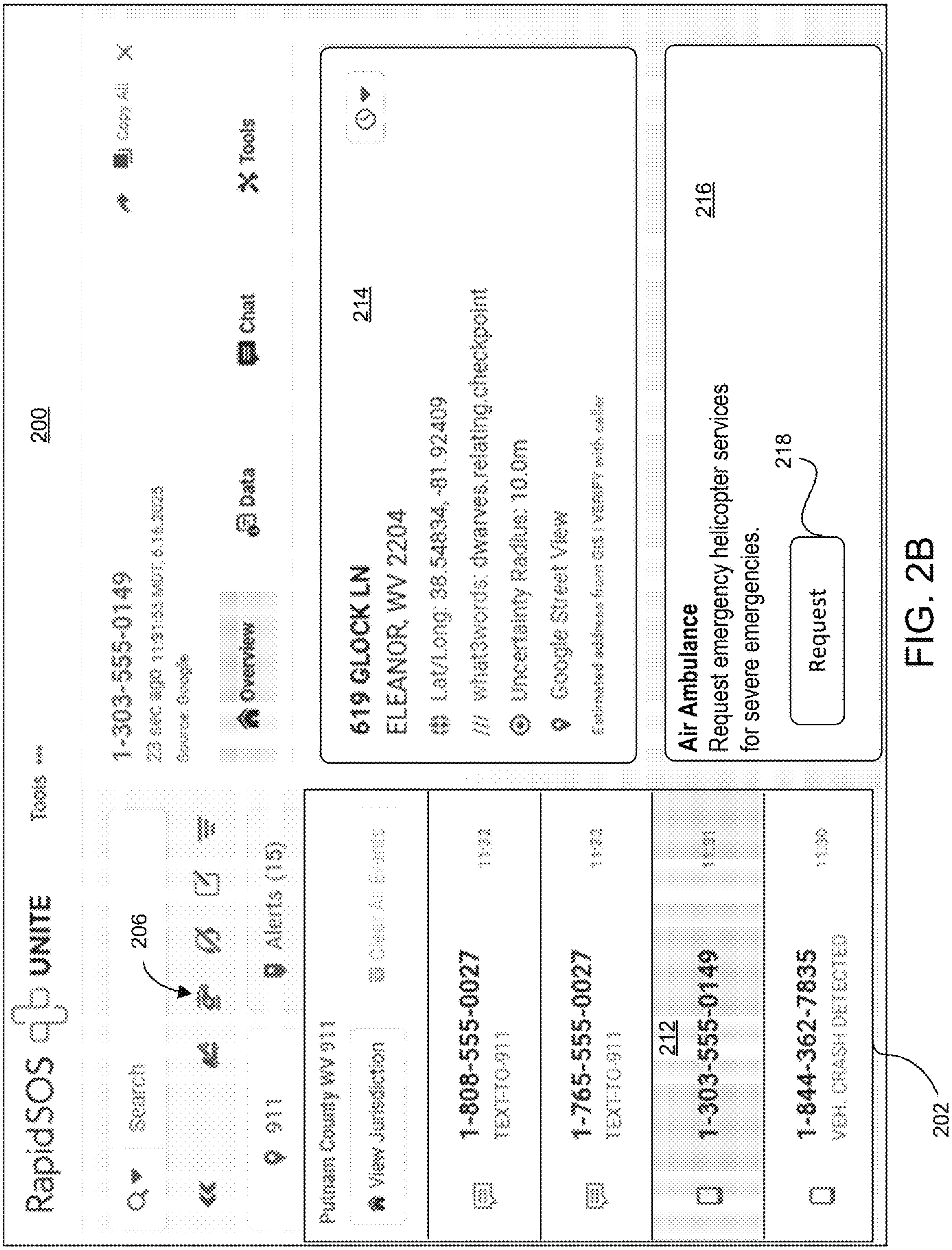

FIG. 2B illustrates example UI elements that may be displayed in response to selecting a particular incident 212 from incident queue 202, according to an embodiment. In particular, emergency management UI 200 may be configured to display a data card 214 that includes various information related to the emergency communication associated with the particular incident 212. For example, data card 214 may include, but is not limited to, a street address, a relative address, city, state, ZIP Code, latitude and longitude coordinates, the URL to a map of the location, an uncertainty radius estimate, a link to a mapping service street view, and the like.

Responsive to selection of incident 212, emergency management UI 200 may also be configured to display an air ambulance UI 216, which may be used by a user to initiate a workflow for requesting air ambulance support (e.g., using a request button 218), according to an embodiment. With emergency management UI 200, a user (e.g., a telecommunicator at an ECC) may use dispatch icon 206 and/or request button 218 to initiate a workflow to dispatch an air ambulance, according to an embodiment.

Figure 2C:
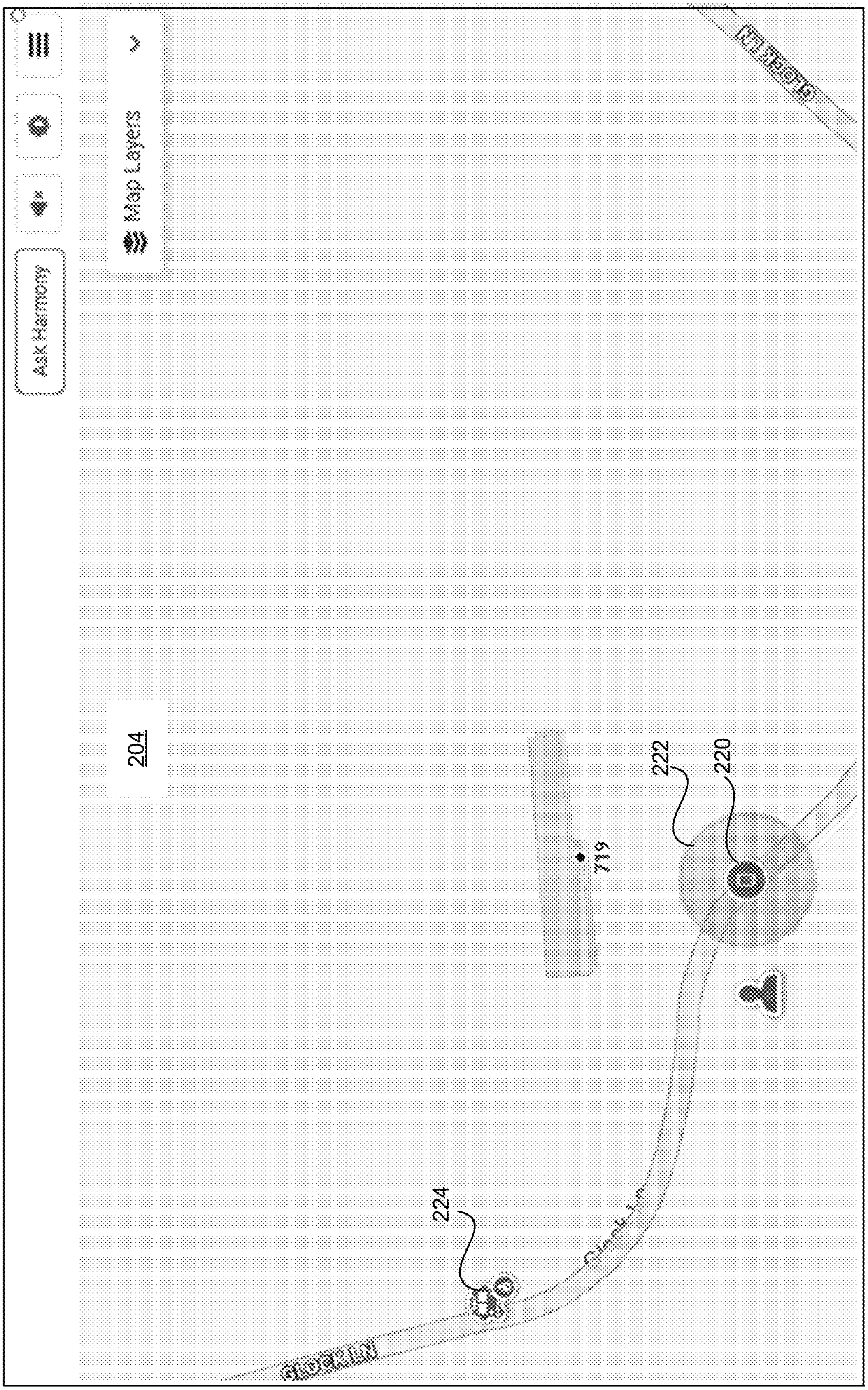

FIG. 2C illustrates an example view of map 204 that includes a location 220 that may be associated with incident 212 and a highlighted region 222 that indicates to the user that location 220 is associated with the selected incident 212, according to an embodiment. Emergency management UI 200 may also be configured to display field responder icons 224 (e.g., ambulance, fire truck, police car, etc.) that correspond to a location of a particular field responder, in real-time, from information received from one or more field responder devices and/or servers, according to embodiments of the disclosure.

Figure 2D:
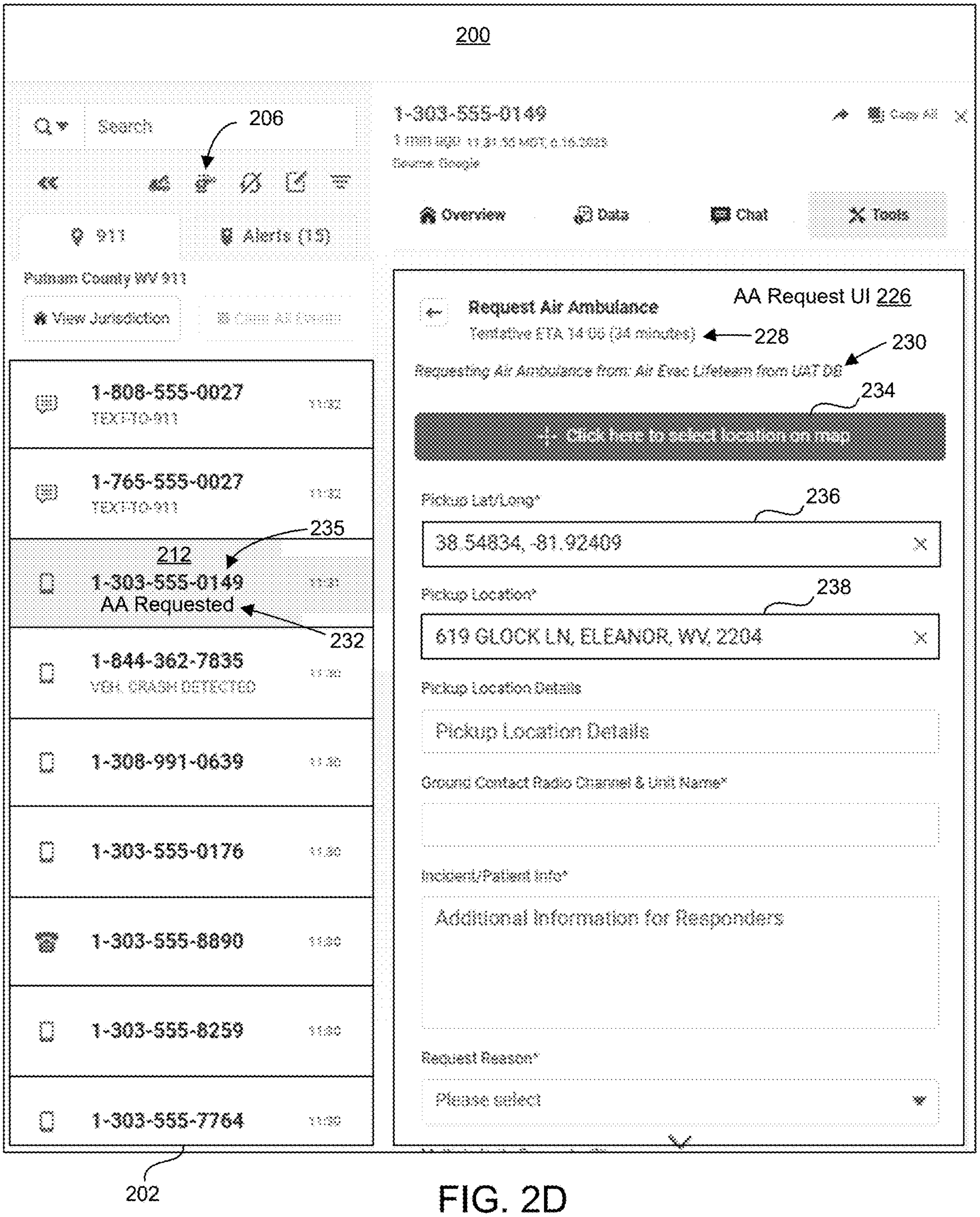
Figure 2E:
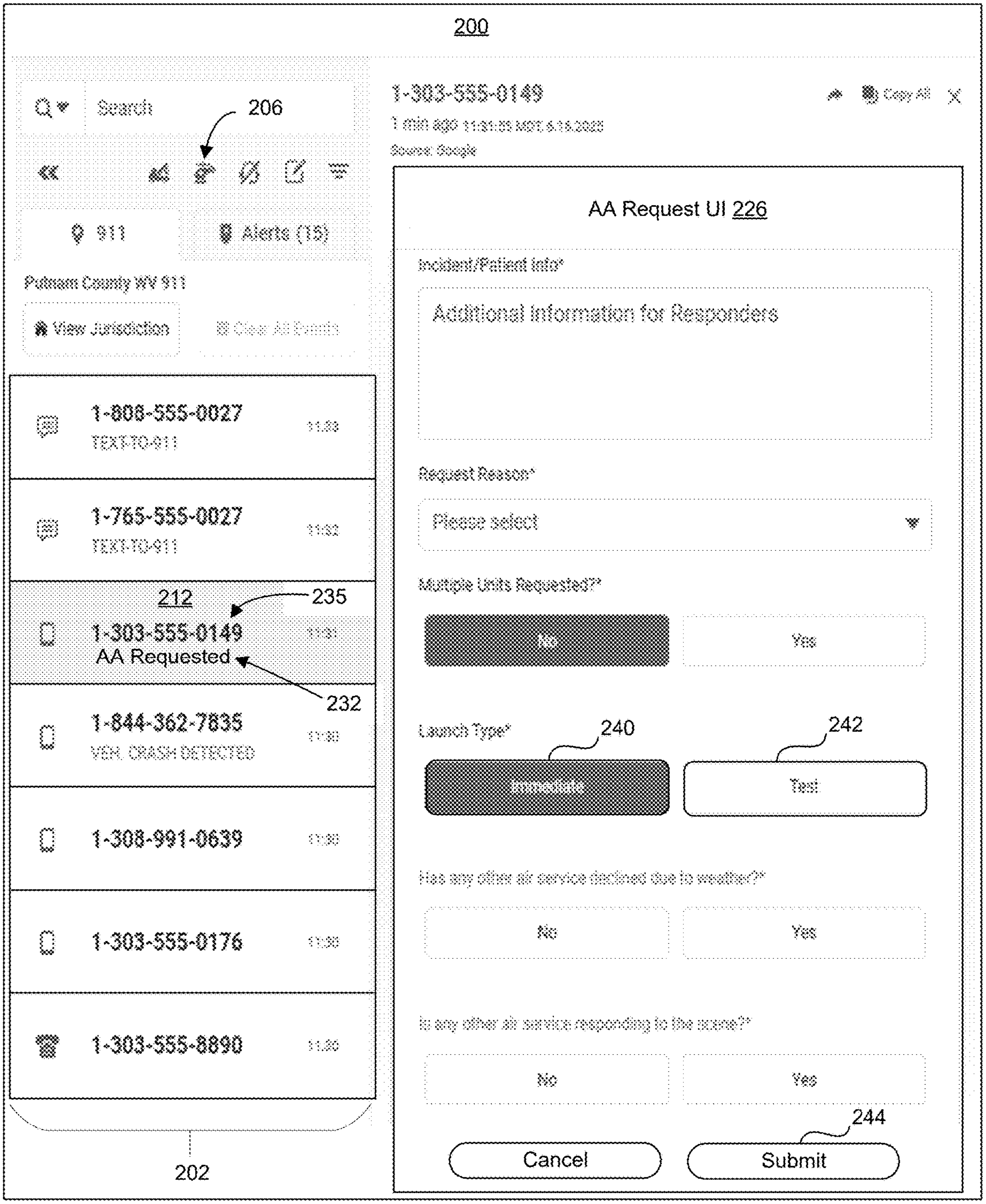

FIGS. 2D and 2E illustrate an example implementation of an air ambulance (AA) request UI 226 that may be displayed in emergency management UI 200, responsive to user selection of dispatch icon 206 and/or air ambulance request button 218, according to an embodiment. Air ambulance request UI 226 may be displayed/presented in emergency management UI 200 as a form having a number of text elements, message boxes, selection elements, and/or buttons, in accordance with aspects of the disclosure.

Air ambulance request UI 226 may include an ETA 228 that is based on preparation time for an air ambulance (e.g., helicopter, airplane, drone, etc.) and travel time from a current location of the air ambulance to a requested destination (e.g., a pickup location) for the air ambulance. ETA 228 may be provided to ERDS 102 from air ambulance server 103 using, for example, one or more API. In one implementation, ERDS 102 estimates ETA 228 based on a current location of an air ambulance and based on the requested destination of the ambulance. ETA 228 may be a tentative ETA that a telecommunicator uses to determine whether to dispatch an air ambulance or a ground ambulance, according to an embodiment. For example, if a ground ambulance is 15 minutes away, but ETA 228 indicates 34 minutes, then a telecommunicator may opt to dispatch a ground ambulance to provide life support services to a person or persons involved in an incident.

Air ambulance request UI 226 includes a status update 230 that is example implementation of status update 178 (shown in FIG. 1B), according to an embodiment. Status update 230 may include a status of an air ambulance request, confirmation of acceptance of the air ambulance request, denial of an air ambulance request, an indication of whether the air ambulance is en route to the incident location or to a hospital, a landing zone selection (e.g., by an air ambulance pilot), or the like.

Status update 230 from air ambulance request UI 226 may be represented as a status update 232 in one or more of the incidents represented in incident queue 202. For example, status update 232 may be displayed under a telephone number 235 of incident 212, according to an embodiment. Status update 232 may be an abbreviated form of status update 230. Examples of status update 232 may include, but are not limited to, air ambulance requested, air ambulance en route, air ambulance returning, air ambulance delayed, weather delay, air ambulance canceled, air ambulance confirmed, or the like.

Air ambulance request UI 226 may include a location selection button 234, according to an embodiment. Location selection button 234 may enable a user to change the pickup location on map 204. For example, in response to receiving a selection (e.g., a click) of location selection button 234, map 204 may be responsive to a location selection within map 204. A location selection within map 204 may update coordinates of the pickup location within air ambulance request UI 226. Coordinates of the pickup location may warrant adjustment if the location of the initiated emergency communications is insufficient for landing and/or takeoff of an air ambulance.

When manually selecting a pickup location, a user may select from one or more predetermined landing zones displayed on map 204. Landing zones may be received from air ambulance server 103 and may be displayed on map 204. ERDS 102 may store coordinates for landing zones and may be configured to display one or more landing zones that are in proximity to the initial coordinates of a pickup location, for example.

Coordinates for a pickup location may be displayed in various formats, according to various embodiments of the disclosure. In a text box 236, air ambulance request UI 226 may display pickup coordinates as latitude and longitude coordinates. In a text box 238, air ambulance request UI 226 may display pickup coordinates as a street address or a relative address (e.g., the northeast corner of Wilmer Park), for example.

Referring to FIG. 2E, air ambulance request UI 226 may enable test mode operations that are selectable by a user, according to an embodiment. To support test mode, air ambulance request UI 226 may include a first button 240 for non-test requests and may include a second button 242, for test air ambulance requests. When the difference between life or death of a person in an emergency comes down to minutes or seconds of delays of field responders arriving at a scene, a telecommunicator may feel anxiety about using a new tool and may be reluctant to implement a time-saving tool without familiarity with the tool. Selection of second button 242 may enable a test mode that allows a telecommunicator to practice requesting air ambulance support to locations selected on map 204. Test mode may simulate status updates 230 and 232, as well as provide a graphical simulation of an air ambulance traveling to and from a test location shown on map 204 or selected on map 204 by a telecommunicator in test mode.

Upon at least partial completion of air ambulance request UI 226, a submit button 244 may become active to enable submission of air ambulance requests by a telecommunicator. In one embodiment, submit button 244 is always active. In one embodiment, submit button 244 is active once a pickup location has been populated within air ambulance request UI 226.

Various other information may be received from a user as dispatch content within air ambulance request UI 226, according to an embodiment. Some of the content may be a requirement of a particular air ambulance service, and others of the content may be based on regulated requirements. Additional information includes, but is not limited to, pickup location details, ground contact radio channel, a unit name on the ground, incident information, patient information, a reason for the air ambulance request, whether or not another air service has declined an air ambulance request (e.g., due to weather), and/or whether or not another air service is responding to the incident, as various examples.

Figure 2F:
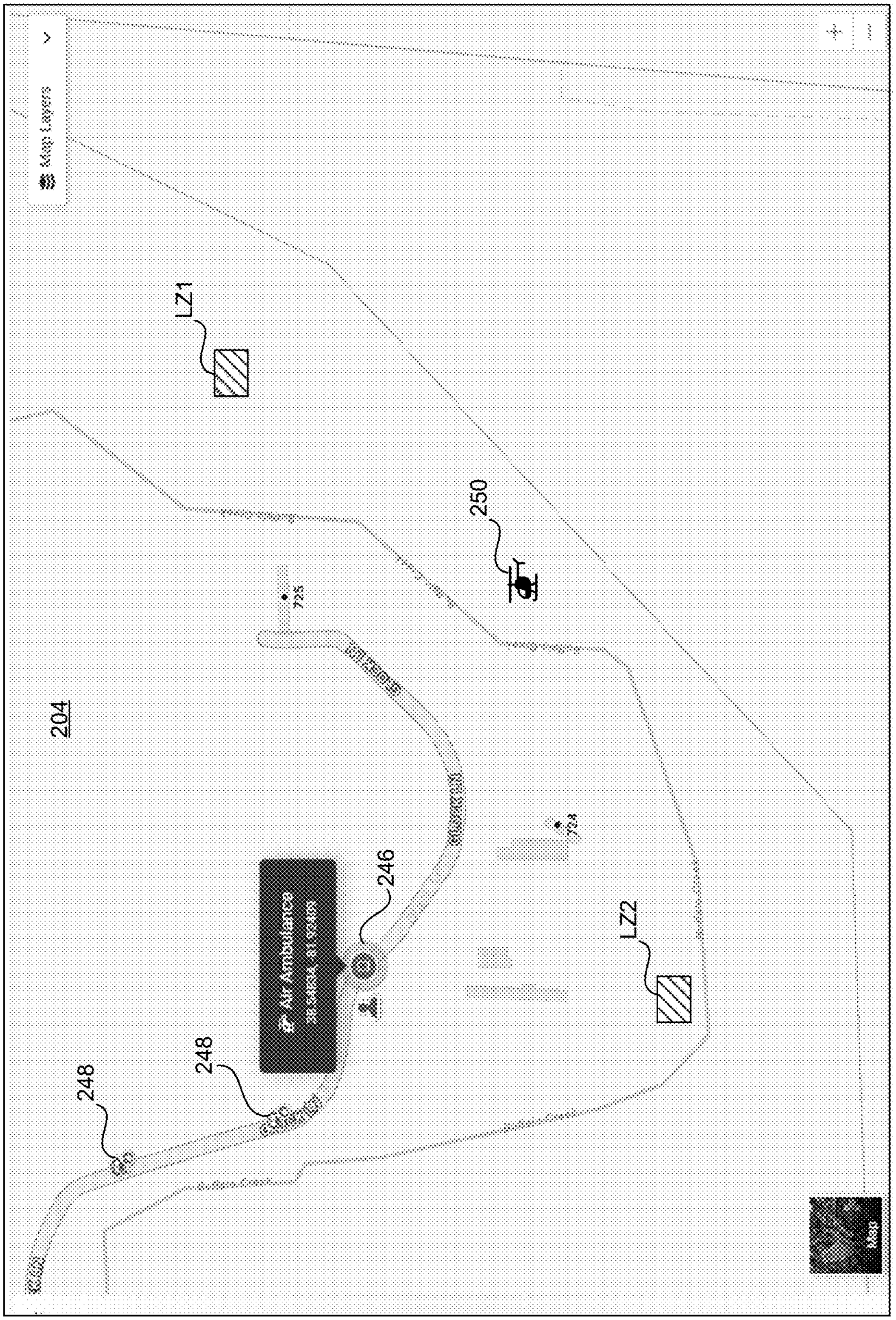

FIG. 2F illustrates an initial air ambulance pickup location 246 and example landing zones LZ1 and LZ2 that may be displayed along with air ambulance request UI 226. Map 204 may display one or more icons 248 representing updated locations of field responders, as well as an icon 250 of an approximate real-time location of the requested air ambulance to provide visual information to the telecommunicator and to support effective and efficient communications between an ECC and build responders.

Figure 2G:
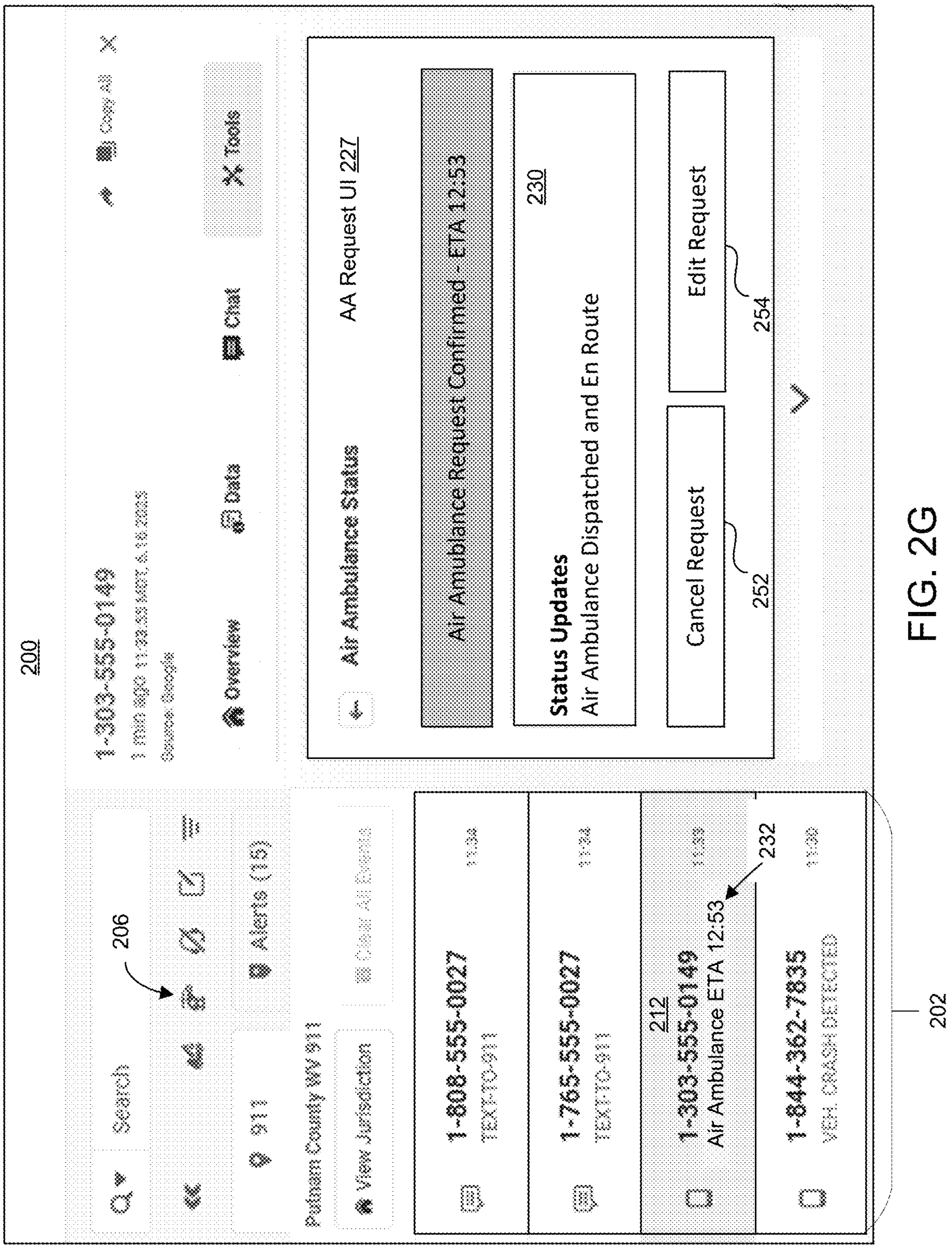

FIG. 2G illustrates an air ambulance request UI 227 that may be displayed after selection of submit button 244 (shown in FIG. 2E). Air ambulance request UI 227 may provide a cancel request button 252 and an edit request button 254 that represent options to cancel an air ambulance request or edit an air ambulance request. Air ambulance request UI 227 may also be configured to display an ETA for air ambulance and display status updates 230 and 232, for example. Air ambulance request UI 227 and/or another UI or data card may include additional air ambulance information, such as, but not limited to, the air ambulance brand, a flight base of origin, a tail number or identifier, a flight status, a transport URL, a pickup location, a destination location, dispatch center name, dispatch center phone, ETA, speed, heading, elevation, and/or time of last update, for example.

Figure 2H:
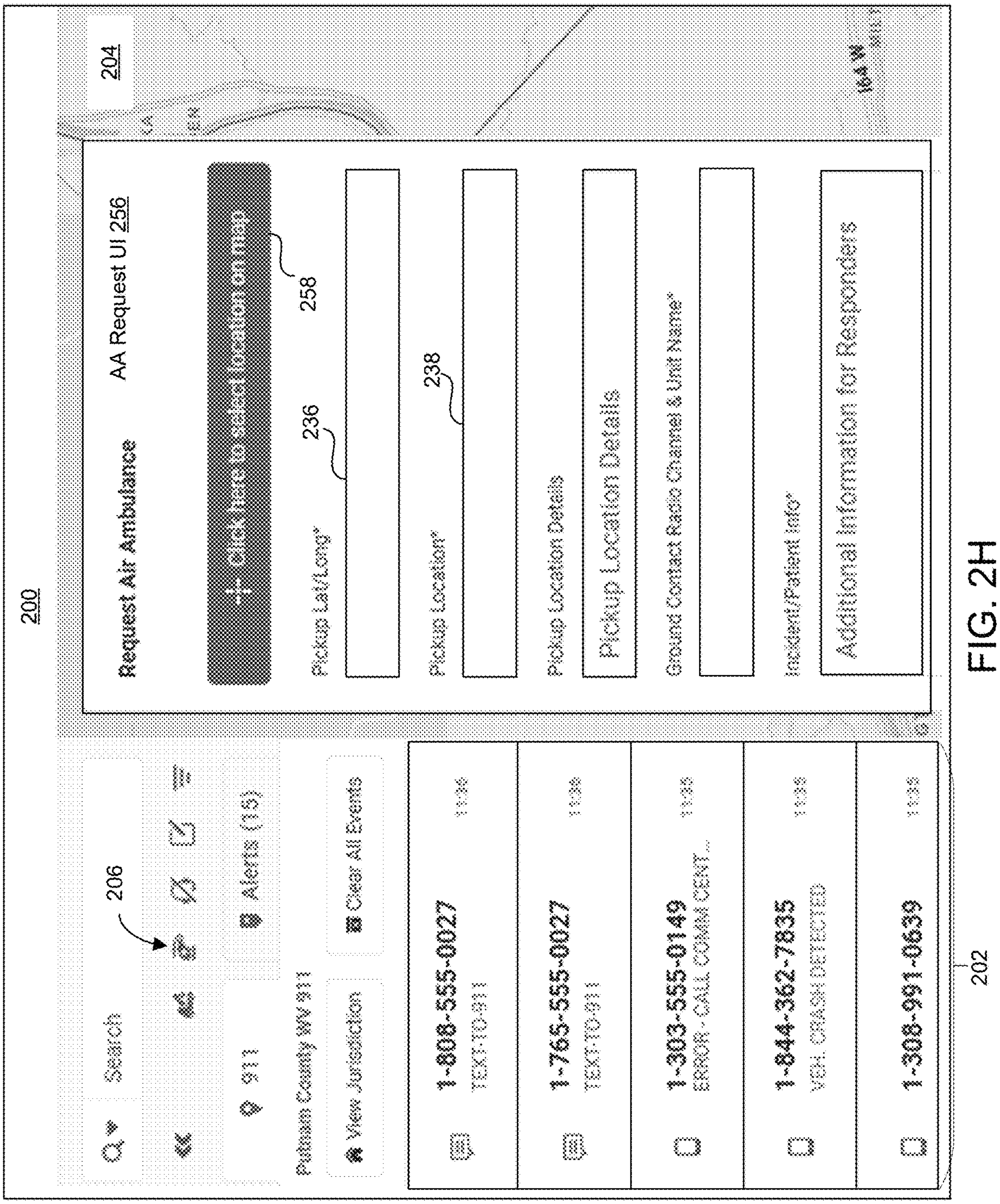

FIGS. 2H, 2I, 2J, and 2K illustrate an example of an alternative air ambulance request workflow in an emergency response system, in accordance with aspects of the disclosure. FIG. 2H illustrates an air ambulance request UI 256 that may be displayed by emergency management UI 200 in response to selection of dispatch request icon 206 without selection of an incident from incident queue 202, for example. Air ambulance request UI 256 may enable a user to select a pickup location for an air ambulance that may be based on radio traffic from field responders, rather than a text message to 911 or a 911 call. Air ambulance request UI 256 may include a location selection button 258 (or other user selectable UI element), which enables a user to select any location on a map to populate text box 236 and/or text box 238, according to an embodiment.

Figure 2I:
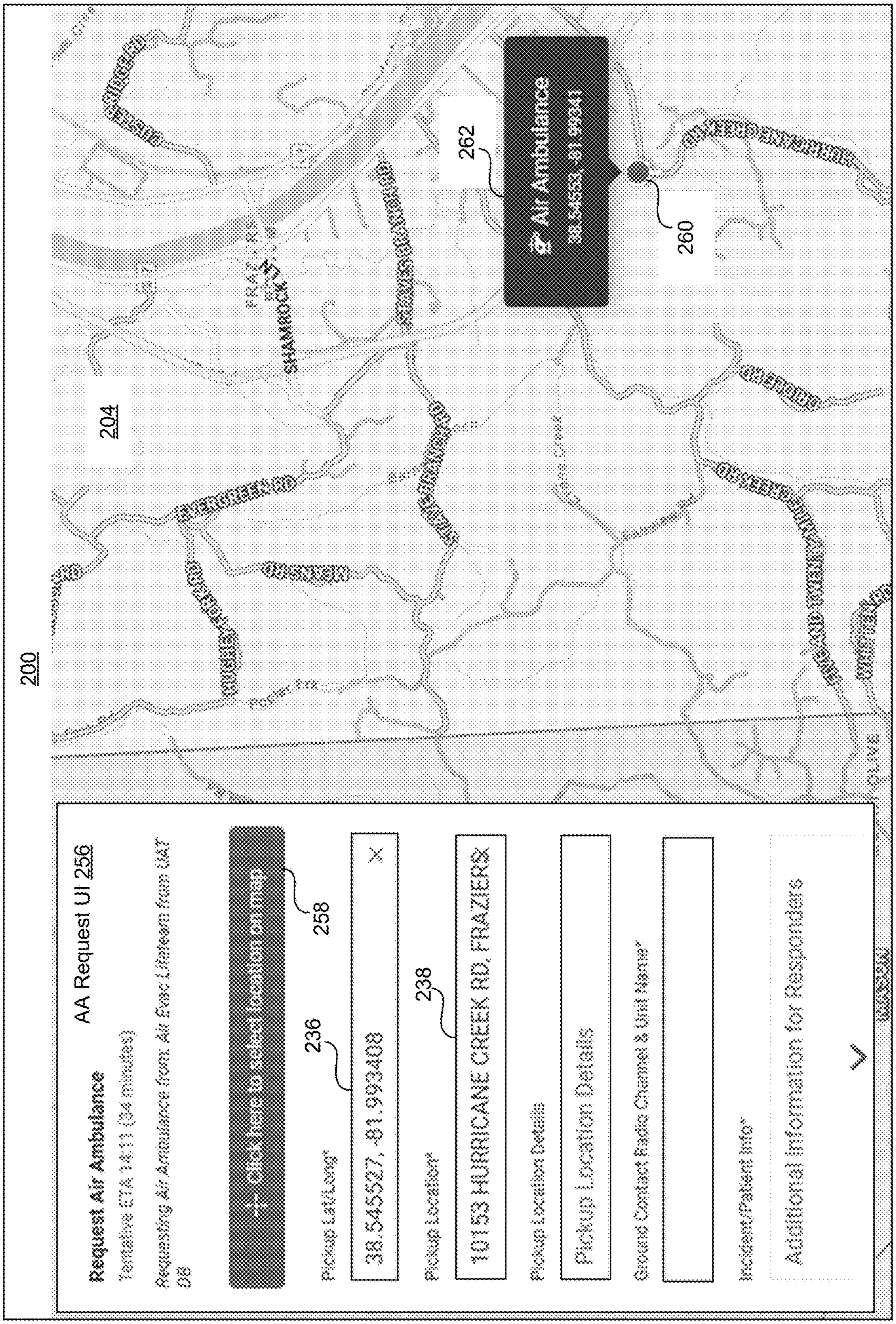

FIG. 2I illustrates a pickup location 260 that may be selected by, for example, a mouse click, or other user action. Emergency management UI 200 may be configured to display a message 262 indicating that air ambulance is being requested at particular coordinates. Responsive to selection of pickup location 260, air ambulance request UI 256 may populate text box 236 and/or text box 238 the location coordinate information that corresponds to pickup location 260.

Figure 2J:
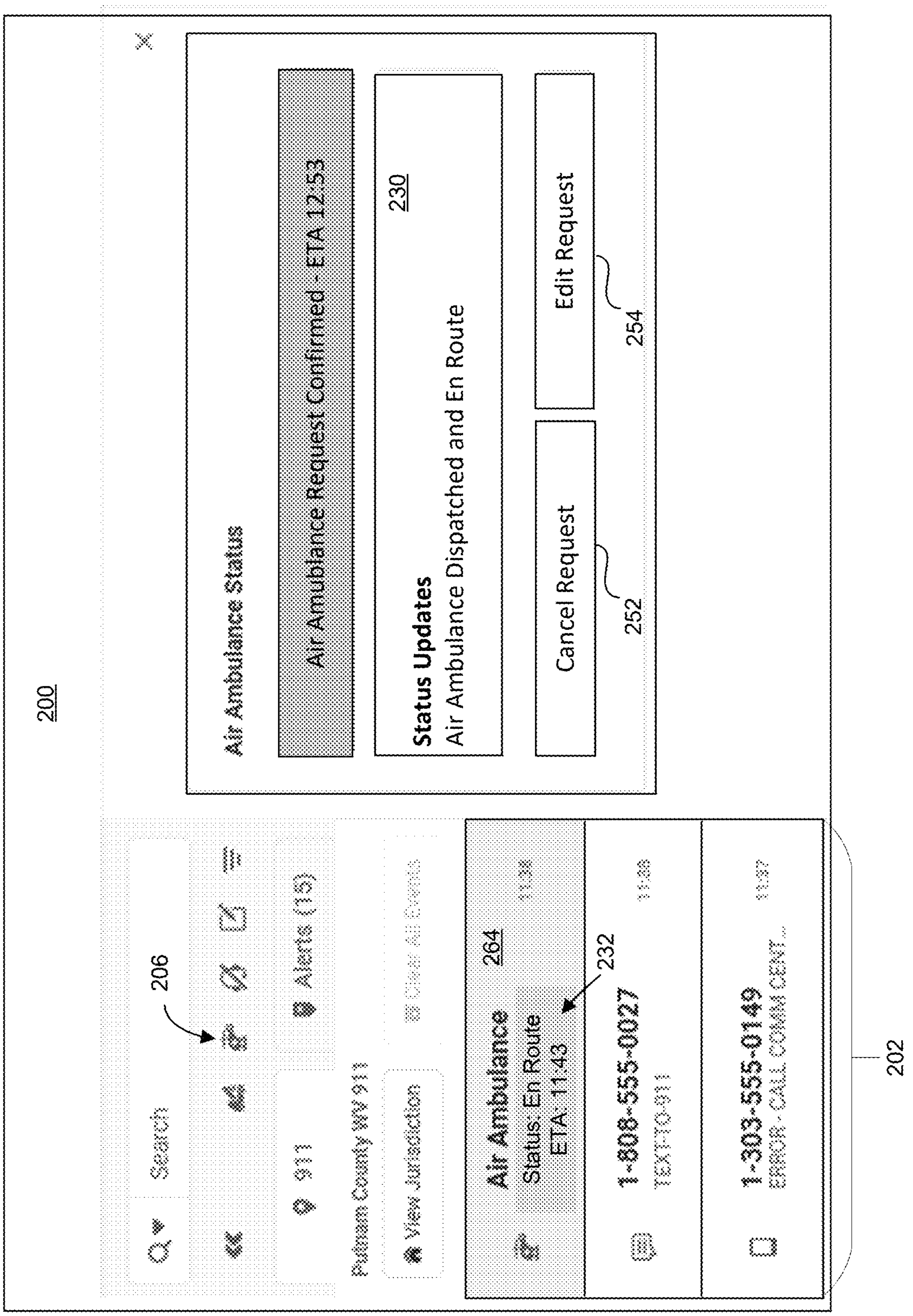

FIG. 2J illustrates an air ambulance incident 264 that may be inserted into incident queue 202 in response to submission of an air ambulance request using air ambulance request UI 256. Air ambulance incident 264 is a unique display of an incident type that may be defined by information received from a field responder and/or over non-cellular communications, for example.

Figure 2K:
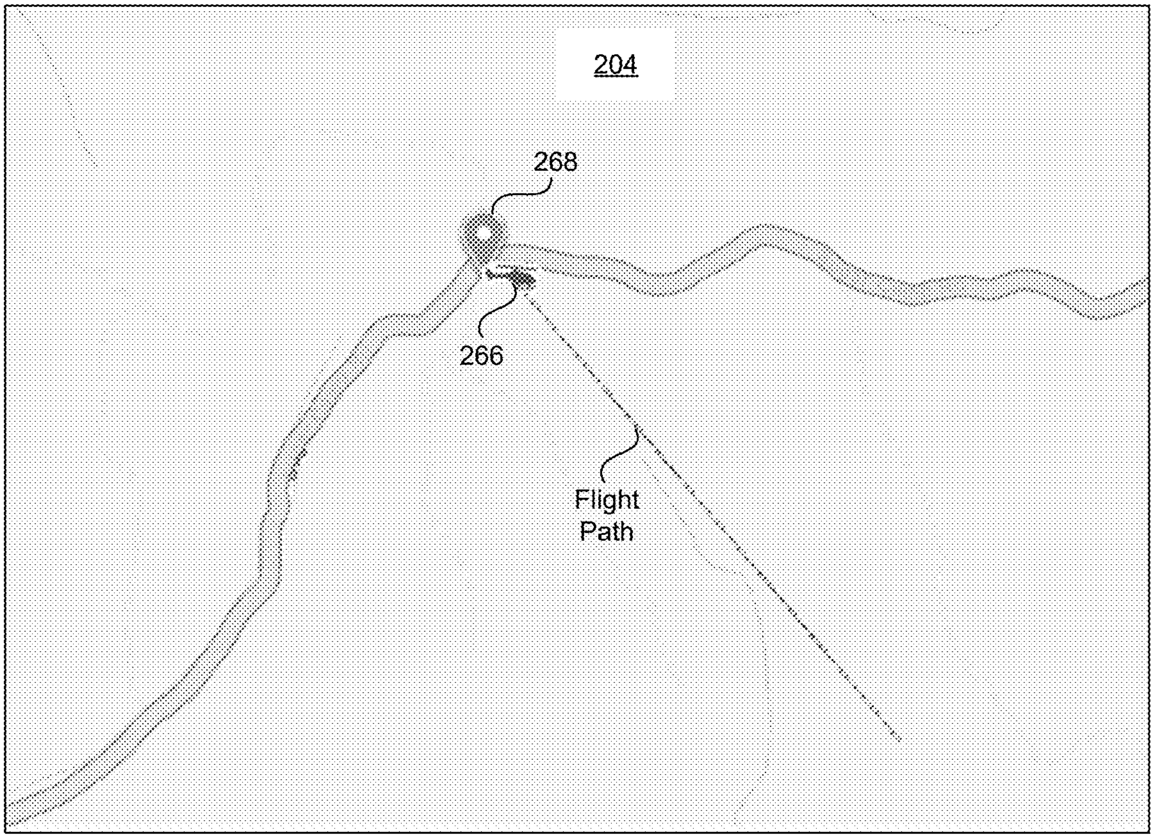

FIG. 2K illustrates an example of an air ambulance icon 266 en route to a pickup location 268 within map 204, according to an embodiment. Displaying air ambulance icon 266 at approximated real-time locations within map 204, along with icons representative of other field responders, provides visual information to an ECC that enables a telecommunicator to coordinate the efforts of multiple teams to help one or more accident victims or patients using air ambulance support, in accordance with embodiments of the disclosure.

Figure 3:
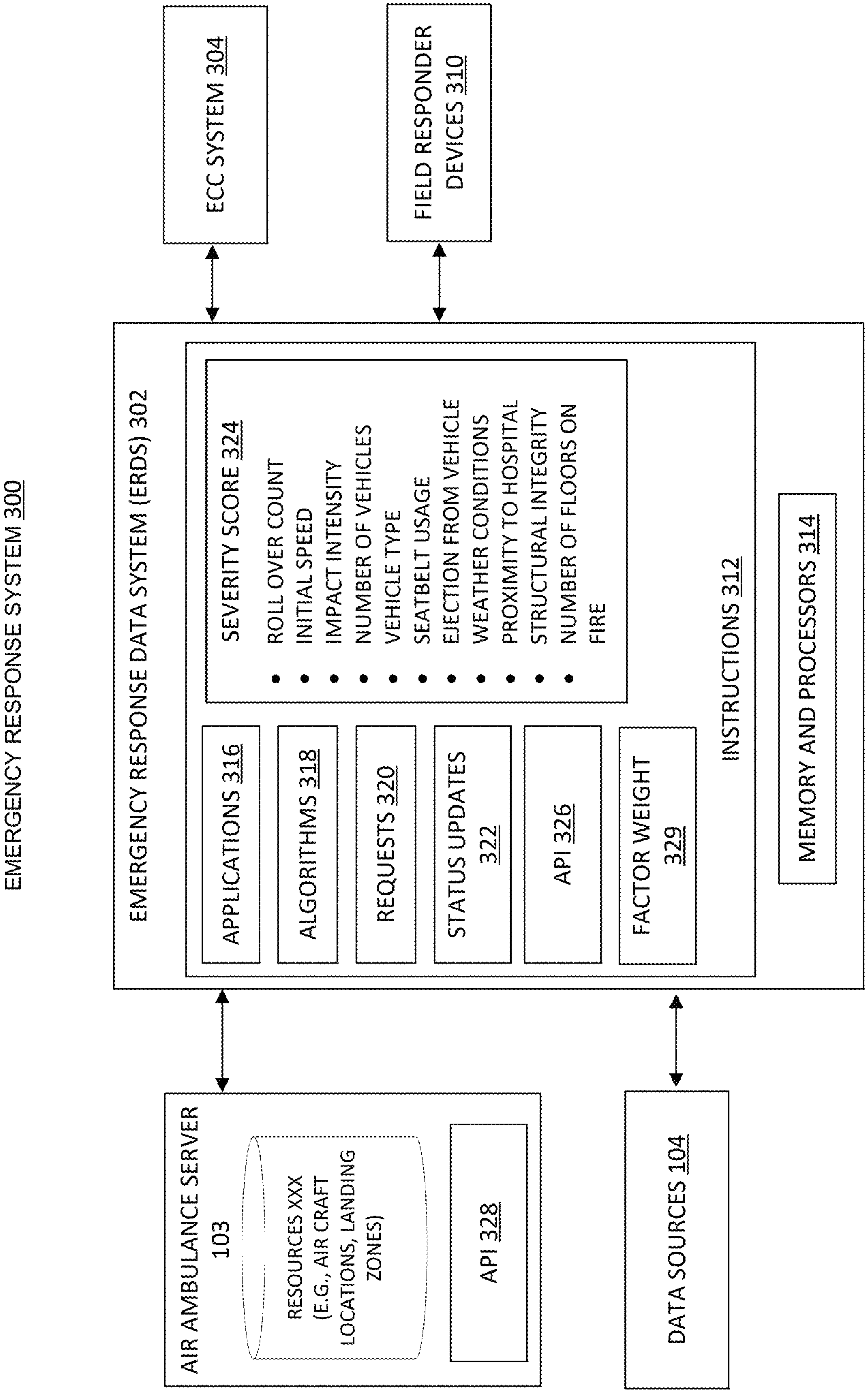
FIG. 3 illustrates an example diagram of user interfaces and processes for providing agentic AI emergency response analytics in an emergency management application, in accordance with embodiments of the disclosure.

FIG. 3 illustrates an example diagram of an emergency response system 300 configured to support air ambulance dispatch operations, in accordance with embodiments of the disclosure. Emergency response system 300 may include ERDS 302, ECC 304, air ambulance server 103, data sources 104, and field responder devices 310 communicatively coupled together to support air ambulance dispatch services from ECC system 304, in accordance with aspects of the disclosure. Emergency response system 300 may be configured to support automated air ambulance dispatch operations, in addition to supporting the dispatch techniques disclosed in FIGS. 2A-2K, according to embodiments of the disclosure. Emergency response system 300 may include one or more of the features or components of emergency response systems 100 and/or 140. In operation, ERDS 302 may receive data from one or more data sources 104, may determine that an incident has occurred that warrants an air ambulance dispatch, may initiate communication with air ambulance server 103 to dispatch an air ambulance to a particular location, and may be operable to notify ECC system 304 and field responder devices 310 (e.g., smartphones, in-vehicle displays, fire station computing systems, etc.) that an air ambulance has been dispatched.

To support automated air ambulance dispatching, ERDS 302 may include instructions 312 and memory and processors 314, according to an embodiment. Memory and processors 314 are configured to execute instructions 312 to perform one or more methods, processes, or other operations, in accordance with aspects of the disclosure. Instructions 312 may include one or more applications 316, algorithms 318, requests 320, status updates 322, and a severity score 324, according to an embodiment. Applications 316 may represent emergency management applications operated by ECC system 304 and field responder devices 310, according to an embodiment. Algorithms 318 may include one or more processes used to determine a severity score 324 that may result in air ambulance requests 320, according to an embodiment. For example, if data sources 104 include accelerometer data, gyroscope data, and/or other telematics data that indicate that a vehicle rolled over on a freeway four times from an initial speed of 85 mph to a final speed of 0 mph within five seconds, severity score 324 may be defined as a level 9 severity on a severity scale of 0 to 10.

Severity score 324 may be based on several factors or types of data from data sources 104. For example severity score 324 may be based on rollover count, initial vehicle speed, impact intensity, number of vehicles involved, a vehicle type (e.g., truck, semi-truck, motorcycle, electric vehicle, train, etc.), seatbelt usage, ejection from a vehicle, weather conditions, proximity to a hospital, structural integrity of a building, and/or a number of floors that appear to be on fire, for example. The factors may be individually evaluated and scored, and each factor may have an individual factor weight 329 applied to it-allowing more life-threatening factors to be weighted more heavily that less life-threatening factors within the severity score 324.

ERDS 302 may have one or more predefined thresholds that may be configured to generate and transmit air ambulance requests 320. For example, the threshold may be level 6, so a severity score 324 that exceeds level 6 on a severity scale of 0 to 10 would result in an automated air ambulance dispatch, as an illustrative example. ERDS 302 may use or provide one or more API 326 to receive information from air ambulance server 306 and may be configured to use API 328 that may be provided by air ambulance server 306 for external systems to communicate and receive information to interface with air ambulance server 306.

In some embodiments, emergency response ERDS 302 leverages one or more LLMs, AI agents, or other agent AI tools as at least part of algorithms 318 to determine severity score 324 and/or to determine whether or not to automatedly (e.g., without ECC user interaction) generate and transmit air ambulance requests 320 to air ambulance server 306, according to an embodiment. One or more LLMs, or AI agents may be trained on data sources 104 and on the level of threat to life of people who were in previous life-threatening incidents, to enable the LLM and/or the AI agent to define severity score 324 on a case-by-case basis while leveraging hundreds, thousands, or millions of previous life-threatening incidents, in accordance with aspects of the disclosure.

Figure 4A:
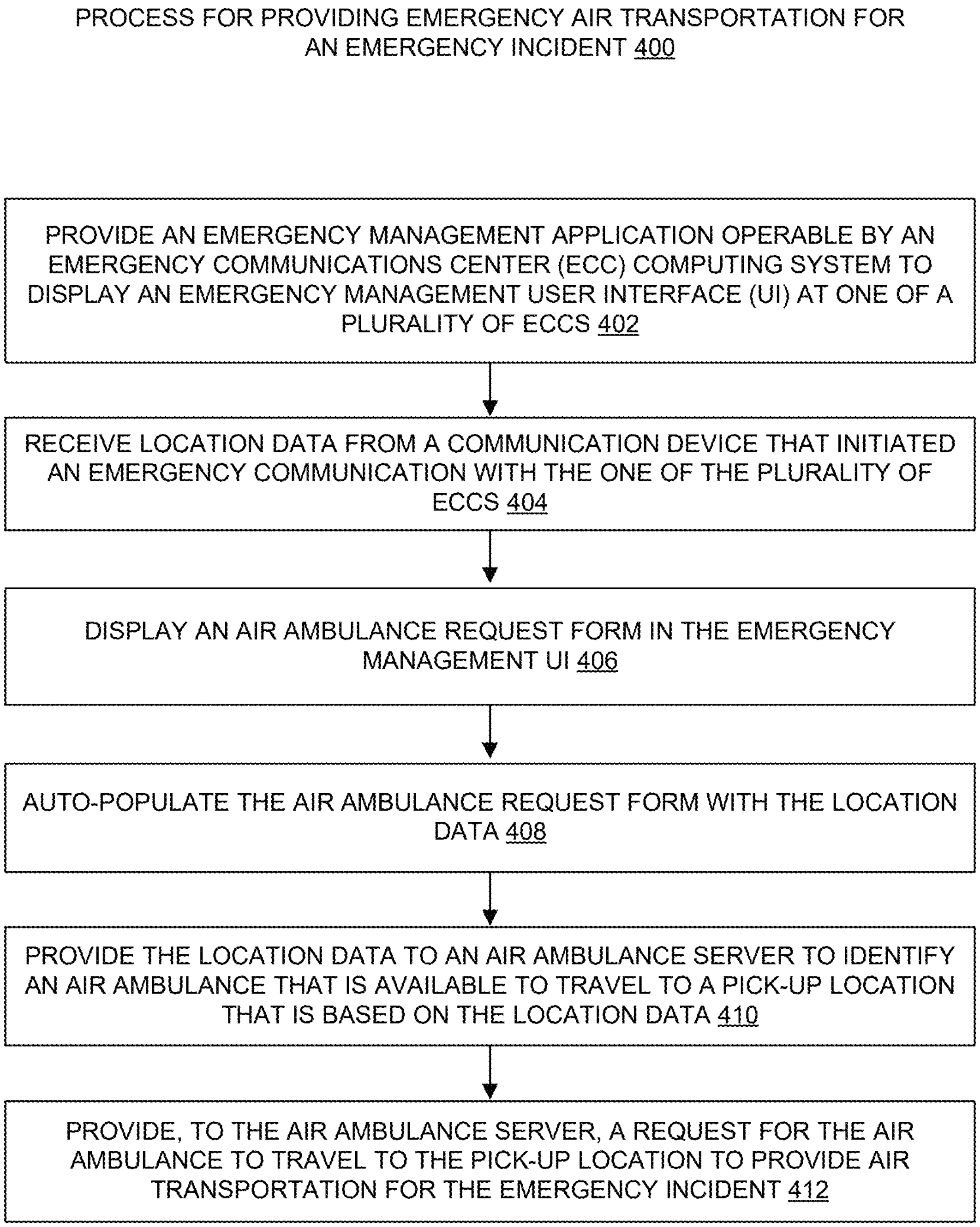
FIGS. 4A and 4B illustrate example flow diagrams of processes for providing emergency air transportation for an emergency event with an emergency management UI hosted by an emergency response data system, in accordance with embodiments of the disclosure.
Figure 4B:
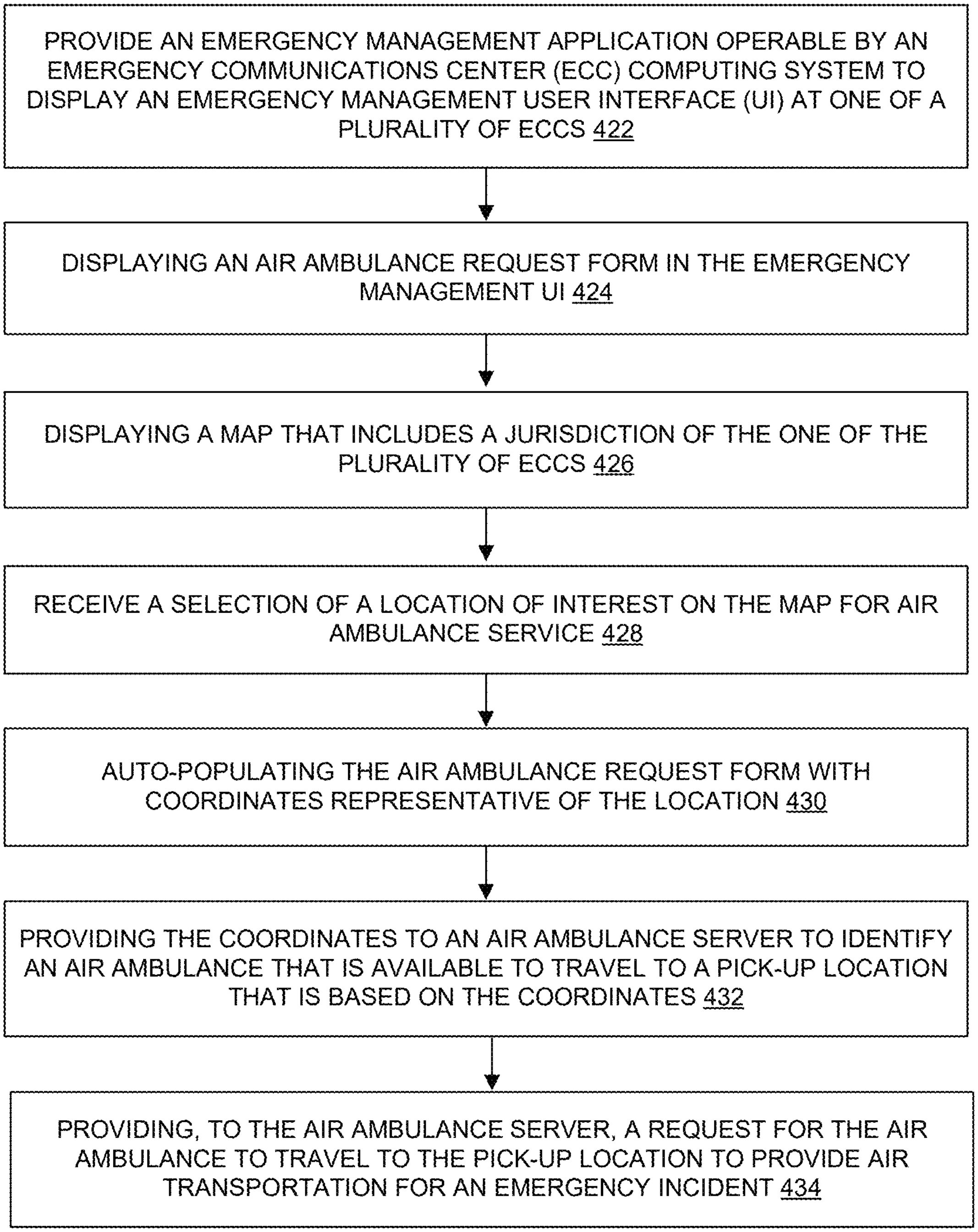

FIGS. 4A and 4B illustrate flow diagrams of processes for providing emergency air transportation for an emergency event with an emergency management UI hosted by an emergency response data system, in accordance with aspects of the disclosure.

FIG. 4A illustrates a flow diagram of a process 400 for providing emergency air transportation for an emergency event with an emergency management UI hosted by an emergency response data system, in accordance with aspects of the disclosure. Process 400 may be implemented by one or more aspects of disclosed emergency response systems or emergency response data systems (e.g., the AI assistant system, one or more AI agents, one or more LLMs, etc.). Process 400 includes a number of operations; it is to be understood that one or more of the operations may be performed out of the described order and/or in parallel with other operations.

At operation 402, process 400 includes providing an emergency management application operable by an emergency communications center (ECC) computing system to display an emergency management user interface (UI) at one of a plurality of ECCs, according to an embodiment.

At operation 404, process 400 includes receiving location data from a communication device that initiated an emergency communication with the one of the plurality of ECCs, according to an embodiment.

At operation 406, process 400 includes displaying an air ambulance request form in the emergency management UI, according to an embodiment. The system presents a digital UI/form within the emergency management application's interface, allowing ECC personnel to request air ambulance services.

At operation 408, process 400 includes auto-populating the air ambulance request form with the location data, according to an embodiment. The previously received location data is automatically entered into the air ambulance request form, reducing manual input and potential errors.

At operation 410, process 400 includes providing the location data to an air ambulance server to identify an air ambulance that is available to travel to a pick-up location that is based on the location data, according to an embodiment. The system sends the incident's location to a server managed by an air ambulance service provider, which then determines and identifies an available air ambulance capable of responding to that location.

At operation 412, process 400 includes providing, to the air ambulance server, a request for the air ambulance to travel to the pick-up location to provide air transportation for the emergency incident, according to an embodiment. Finally, a formal request for air ambulance dispatch is sent to the air ambulance server, initiating the process of sending the air ambulance to the specified pickup location for the emergency.

FIG. 4B illustrates a flow diagram of a process 420 for providing emergency air transportation for an emergency event with an emergency management UI hosted by an emergency response data system, in accordance with aspects of the disclosure. Process 420 may be implemented by one or more aspects of disclosed emergency response systems or emergency response data systems (e.g., the AI assistant system, one or more AI agents, one or more LLMs, etc.). Process 420 includes a number of operations; it is to be understood that one or more of the operations may be performed out of the described order and/or in parallel with other operations.

At operation 422, process 420 includes providing an emergency management application operable by an emergency communications center (ECC) computing system to display an emergency management user interface (UI) at one of a plurality of ECCs, according to an embodiment.

At operation 424, process 420 includes displaying an air ambulance request form in the emergency management UI, according to an embodiment.

At operation 426, process 420 includes displaying a map that includes a jurisdiction of the one of the plurality of ECCs, according to an embodiment. A geographical map is shown within the UI, and the geographical map may be configured to indicate the area of responsibility for the ECC.

At operation 428, process 420 includes receiving a selection of a location of interest on the map for air ambulance service, according to an embodiment. Instead of an automatically determined location, the user (e.g., a telecommunicator) manually selects a specific point on the displayed map where air ambulance service is needed.

At operation 430, process 420 includes auto-populating the air ambulance request form with coordinates representative of the location, according to an embodiment. The system may automatically fill in the air ambulance request form with the precise coordinates corresponding to the location selected by the user on the map.

At operation 432, process 420 includes providing the coordinates to an air ambulance server to identify an air ambulance that is available to travel to a pick-up location that is based on the coordinates, according to an embodiment. These manually selected coordinates are then sent to the air ambulance server to locate and identify an available air ambulance for dispatch to that specific pickup location.

At operation 434, process 420 includes providing, to the air ambulance server, a request for the air ambulance to travel to the pick-up location to provide air transportation for an emergency incident, according to an embodiment. Finally, a dispatch request is sent to the air ambulance server, initiating the air ambulance's travel to the user-specified pickup location.

Figure 5A:
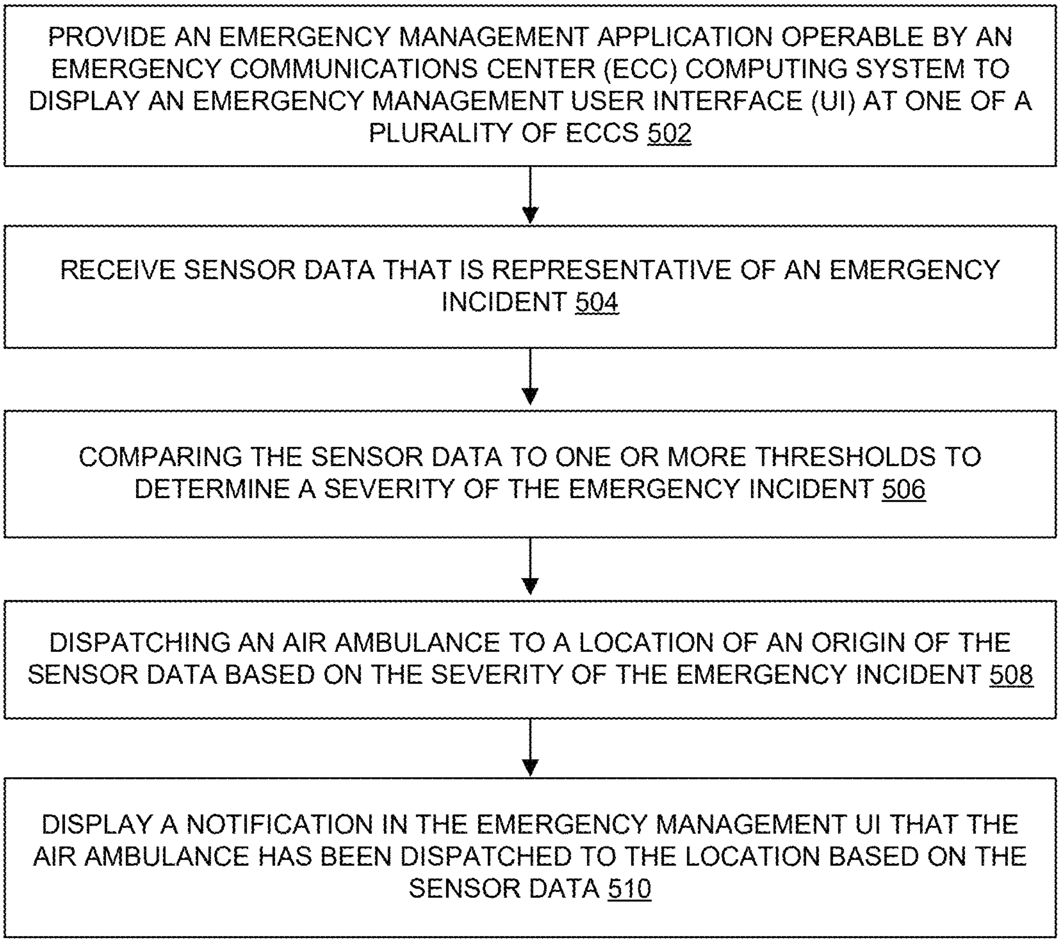
FIGS. 5A and 5B illustrate example flow diagrams of processes for providing emergency air transportation for an emergency event with an emergency management UI hosted by an emergency response data system, in accordance with embodiments of the disclosure.
Figure 5B:
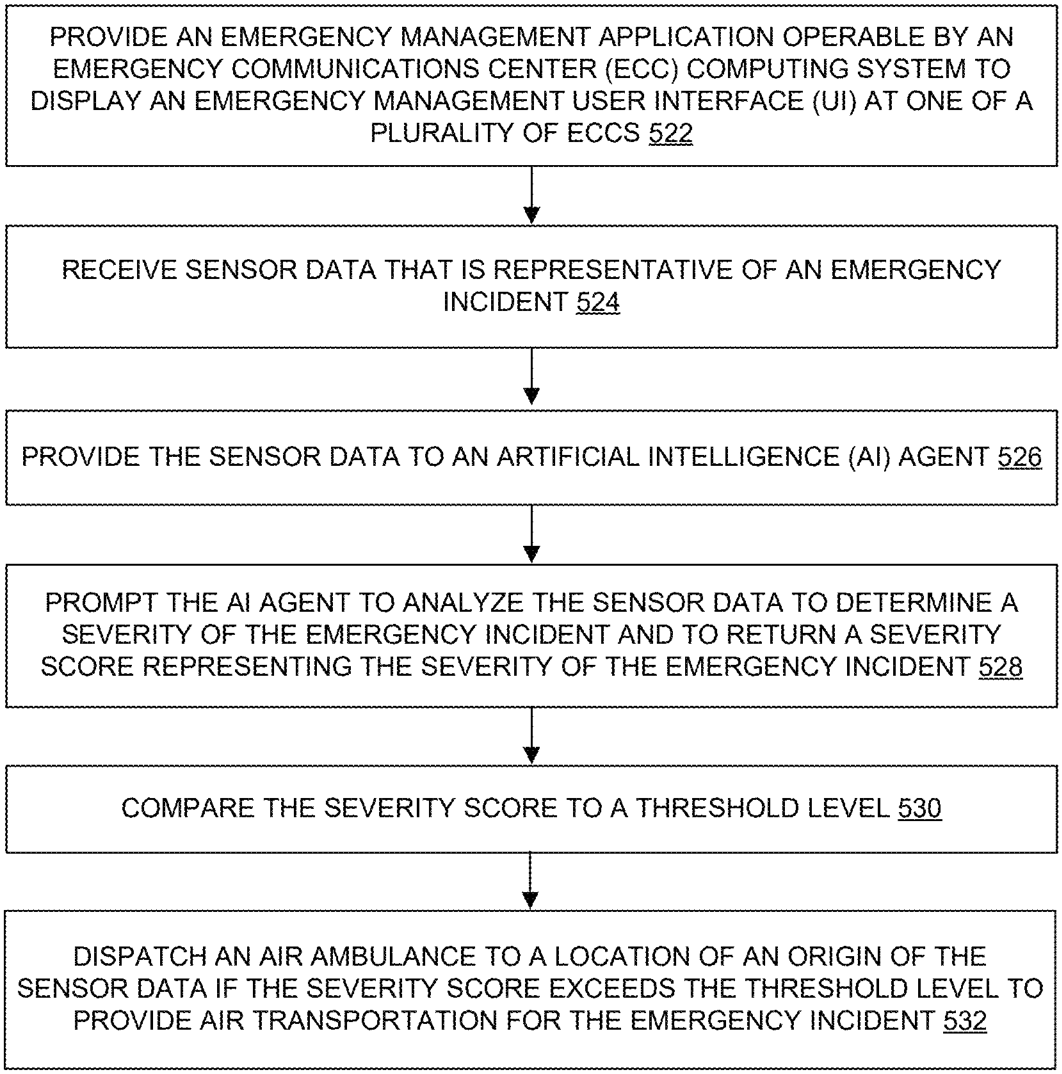

FIGS. 5A and 5B illustrate flow diagrams of processes for providing emergency air transportation for an emergency event with an emergency management UI hosted by an emergency response data system, in accordance with aspects of the disclosure.

FIG. 5A illustrates a flow diagram of a process 500 for providing emergency air transportation for an emergency event with an emergency management UI hosted by an emergency response data system, in accordance with aspects of the disclosure. Process 500 may be implemented by one or more aspects of disclosed emergency response systems or emergency response data systems (e.g., the AI assistant system, one or more AI agents, one or more LLMs, etc.). Process 500 includes a number of operations; it is to be understood that one or more of the operations may be performed out of the described order and/or in parallel with other operations.

At operation 502, process 500 includes providing an emergency management application operable by an emergency communications center (ECC) computing system to display an emergency management user interface (UI) at one of a plurality of ECCs, according to an embodiment.

At operation 504, process 500 includes receiving sensor data that is representative of an emergency incident, according to an embodiment.

At operation 506, process 500 includes comparing the sensor data to one or more thresholds to determine a severity of the emergency incident, according to an embodiment.

At operation 508, process 500 includes dispatching an air ambulance to a location of an origin of the sensor data based on the severity of the emergency incident, according to an embodiment.

At operation 510, process 500 includes displaying a notification in the emergency management UI that the air ambulance has been dispatched to the location based on the sensor data, according to an embodiment.

FIG. 5B illustrates a flow diagram of a process 520 for providing emergency air transportation for an emergency event with an emergency management UI hosted by an emergency response data system, in accordance with aspects of the disclosure. Process 520 may be implemented by one or more aspects of disclosed emergency response systems or emergency response data systems (e.g., the AI assistant system, one or more AI agents, one or more LLMs, etc.). Process 520 includes a number of operations; it is to be understood that one or more of the operations may be performed out of the described order and/or in parallel with other operations.

At operation 522, process 520 includes providing an emergency management application operable by an emergency communications center (ECC) computing system to display an emergency management user interface (UI) at one of a plurality of ECCs, according to an embodiment.

At operation 524, process 520 includes receiving sensor data that is representative of an emergency incident, according to an embodiment.

At operation 526, process 520 includes providing the sensor data to an artificial intelligence (AI) agent, according to an embodiment.

At operation 528, process 520 includes prompting the AI agent to analyze the sensor data to determine a severity of the emergency incident and to return a severity score representing the severity of the emergency incident, according to an embodiment.

At operation 530, process 520 includes comparing the severity score to a threshold level, according to an embodiment.

At operation 532, process 520 includes dispatching an air ambulance to a location of an origin of the sensor data if the severity score exceeds the threshold level to provide air transportation for the emergency incident, according to an embodiment.

Figure 6:
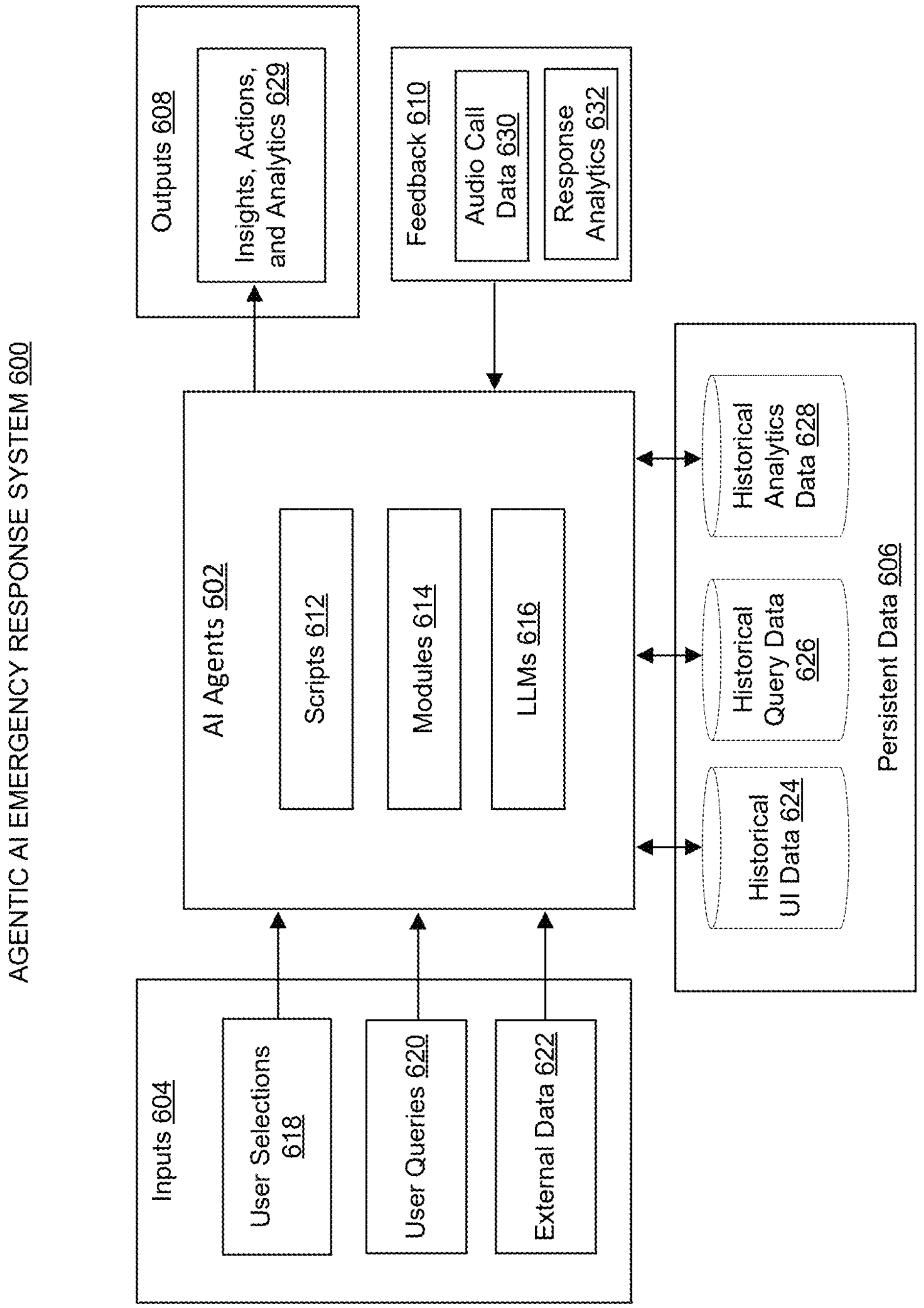
FIG. 6 illustrates an example diagram of an agentic AI emergency response system, in accordance with embodiments of the disclosure.

FIG. 6 illustrates a diagram of an agentic AI emergency response system 600 that includes a number of agents that are operable to analyze data sources 104, generate air ambulance dispatch content, and/or dispatch an air ambulance. Agentic AI emergency response system 600 may include AI agents 602, inputs 604, persistent data 606, outputs 608 and feedback 610, according to an embodiment. AI agents 602 may include scripts 612, modules 614, and/or LLMs 616. Inputs 604 may include user selections 618, user queries 620, and/or external data 622. Persistent data 606 may include historical user interface (UI) data 624, historical query data 626, and historical analytics data 628 (e.g., air ambulance dispatch data) stored in one or more tables, databases, and/or other data structures. Outputs 608 may include, but are not limited to, automated dispatches, dispatch recommendations, severity scores, other insights, other actions, and analytics 629. AI agents 602 may be operable and/or configured to perform self-improvement operations based on feedback 610. Feedback 610 may include audio call data 630 (e.g., live 911 call data) and response analytics 632 (e.g., metrics around the time between receipt of a 911 call and dispatch of appropriate first responders to the location of an emergency).

Figure 7:
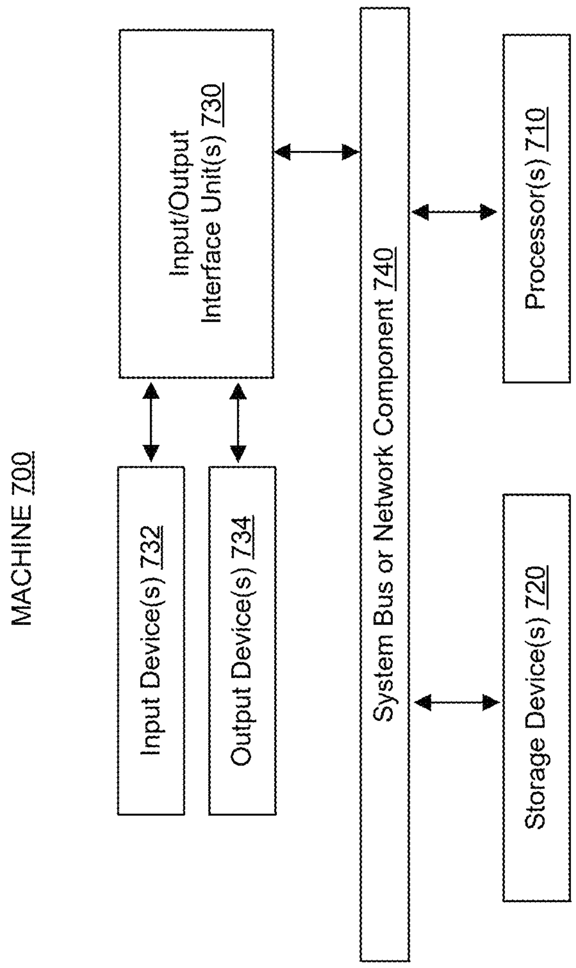
FIG. 7 illustrates an example diagram of a machine, in accordance with embodiments of the disclosure.

FIG. 7 is a high-level block diagram of a machine 700 that may be used to implement one or more of the operations, devices, and/or systems disclosed herein. Machine 700 includes one or more processors 710, one or more input/output interface units 730, one or more storage devices 720, and one or more system buses and/or network components 740 for facilitating the communication of information among the coupled elements. One or more input devices 732 and one or more output devices 734 may be communicatively coupled to the one or more input/output interfaces 730.

The one or more processors 710 may execute machine-executable instructions (e.g., C or C++ running on the Solaris operating system available from Sun Microsystems Inc. of Palo Alto, Calif, or the Linux operating system widely available from a number of vendors such as Red Hat, Inc. of Durham, N.C.) to affect one or more aspects of the present disclosure. At least a portion of the machine executable instructions may be stored (temporarily or more permanently) on the one or more storage devices 720 (e.g., non-transitory computer-readable medium) and/or may be received from an external source via one or more input interface unit 730.

In one embodiment, machine 700 may be one or more conventional personal computers, servers, distributed computing systems, augmented reality devices, virtual reality devices, wearable systems, and/or computing devices. The processors 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, an image sensor, a game pad, a satellite dish, a scanner, or the like, may also (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded with the widest scope consistent with this disclosure, the principles and the novel features disclosed herein.

The term "logic" and/or "processing logic" and/or "data processing hardware" in this disclosure may include one or more processors, microprocessors, multi-core processors, application-specific integrated circuits (ASIC), and/or field programmable gate arrays (FPGAs) to execute operations disclosed herein. In some embodiments, memory may be integrated into the logic to store instructions to execute operations and/or store data. Logic may also include analog or digital circuitry to perform the operations in accordance with embodiments of the disclosure. One or more aspects of the data processing hardware and/or processing logic and/or logic may be distributed between multiple computing systems and/or servers.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device or system may include a desktop computer, a laptop computer, a tablet, a phablet, a smartphone, a feature phone, a server computer, or otherwise. A server computing system may be located remotely in a data center, may be stored locally, and/or may have components (e.g., processors, memory, network interfaces, etc.) that are distributed across one or more locations.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application-specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method of providing emergency air transportation for an emergency incident, comprising:

providing an emergency management application operable by an emergency communications center (ECC) computing system to display an emergency management user interface (UI) at one of a plurality of ECCs, wherein the emergency management UI includes a map and an incident queue of incident telephone numbers of a plurality of communication devices used to contact the one of the plurality of ECCs;

receiving device-based location data from one of the plurality of communication devices that initiated with a 911 call to the one of the plurality of ECCs;

displaying, in response to a selection of one of the incident telephone numbers from the incident queue, an air ambulance UI element in the emergency management UI;

in response to selection of the air ambulance UI element, auto-populating an air ambulance request form with the device-based location data received from the one of the plurality of communication devices that is associated with the selected one of the incident telephone numbers;

providing the location data to an air ambulance server to identify an air ambulance that is available to travel to a pick-up location that is based on the location data;

providing, to the air ambulance server, a request for the air ambulance to travel to the pick-up location to provide air transportation for the emergency incident; and displaying an air ambulance status indicator in the incident queue to display a status of the request for the air ambulance, wherein the air ambulance status indicator is associated with at least one of the incident telephone numbers in the incident queue.

2. The computer-implemented method of claim 1, further comprising:

receiving call data from the one of the plurality of communication devices, wherein the call data includes the device-based location data, one of the incident telephone numbers, and at least one time stamp.

3. The computer-implemented method of claim 1, further comprising:

displaying, on the map in the emergency management UI, one or more potential landing zones based on proximity to a location of the one of the plurality of communication devices; and receiving, on the map, a selection of one of the one or more potential landing zones to define the pick-up location.

4. The computer-implemented method of claim 1, further comprising:

providing a test mode option in the air ambulance request form to support training telecommunicators; and displaying test data that includes a test ETA and a test status update in response to test data received from a user in the air ambulance request form.

5. The computer-implemented method of claim 1, wherein the air ambulance status indicator indicates at least one of air ambulance requested, air ambulance en route, air ambulance returning, air ambulance delayed, weather delay, air ambulance canceled, or air ambulance confirmed.

6. The computer-implemented method of claim 1, wherein the pick-up location is one of a first location of the one of the plurality of communication devices or a second location of a landing zone in proximity to the first location, wherein the first location is represented by the device-based location data.

7. The computer-implemented method of claim 6, further comprising:

displaying the first location and the pick-up location on the map.

8. The computer-implemented method of claim 1, further comprising:

receiving a responder location of the air ambulance;

determining an estimated time of arrival (ETA) of the air ambulance based on the responder location and the pick-up location; and displaying the ETA in the emergency management UI.

9. The computer-implemented method of claim 8, wherein determining the ETA includes aircraft preparation time or aircraft staffing time.

10. The computer-implemented method of claim 1, further comprising:

receiving a status update; and displaying the status update in the emergency management UI.

11. The computer-implemented method of claim 10, wherein the status update includes at least one of a status of the request for the air ambulance, a status of a departure of the air ambulance, a status of an arrival of the air ambulance, or a confirmation of the pick-up location.

12. A computer-implemented method of providing emergency air transportation for an emergency incident, comprising:

providing an emergency management application operable by an emergency communications center (ECC) computing system to display an emergency management user interface (UI) at one of a plurality of ECCs, wherein the emergency management UI includes a map and an incident queue of incidents associated with the one of the plurality of ECCs;

displaying, in response to a selection of one of the incidents from the incident queue, an air ambulance UI element in the emergency management UI;

in response to selecting the air ambulance UI element, providing a location selection tool for selecting a location of interest on the map, wherein the map includes a jurisdiction of the one of the plurality of ECCs;

receiving a selection of the location of interest on the map for air ambulance service;

in response to receiving the selection of the location of interest, auto-populating an air ambulance request form with coordinates representative of the location selected on the map;

providing the coordinates to an air ambulance server to identify an air ambulance that is available to travel to a pick-up location that is based on the coordinates;

providing, to the air ambulance server, a request for the air ambulance to travel to the pick-up location to provide air transportation for an emergency incident; and displaying an air ambulance status indicator in the incident queue to display a status of the request for the air ambulance, wherein the air ambulance status indicator is associated with at least one of the incidents in the incident queue.

13. The computer-implemented method of claim 12, further comprising:

displaying one or more potential landing zones, in response to receipt of the selection of the location of interest;

selecting, on the map, one of the one or more potential landing zones to define the pick-up location; and updating the request for the air ambulance with coordinates of the pick-up location.

14. The computer-implemented method of claim 13, further comprising:

determining an estimated time of arrival (ETA) between the air ambulance and the pick-up location; and displaying the ETA on the emergency management UI.

* * * * *